US007218711B2

(12) United States Patent
Pines et al.

(10) Patent No.: US 7,218,711 B2
(45) Date of Patent: May 15, 2007

(54) COMMUNICATION ASSISTANCE SYSTEM AND METHOD

(76) Inventors: Robert Pines, 136 E. 79th St., PH-15A, New York, NY (US) 10021; Evan Marwell, 23 W. 12th St., New York, NY (US) 10011; John Blakeney, 7630 Sweetwood Dr., Macungie, PA (US) 18062; Christine Baumeister, 429 Windsor Dr., Harleysville, PA (US) 19438

( * ) Notice: Subject to any disclaimer, the term of this patent is extended or adjusted under 35 U.S.C. 154(b) by 0 days.

(21) Appl. No.: 11/059,120

(22) Filed: Feb. 15, 2005

(65) Prior Publication Data
US 2005/0136887 A1    Jun. 23, 2005

Related U.S. Application Data

(62) Division of application No. 10/049,803, filed as application No. PCT/US01/02366 on Jan. 24, 2001, now Pat. No. 6,970,548.

(60) Provisional application No. 60/179,166, filed on Jan. 31, 2000.

(51) Int. Cl.
*H04M 15/00* (2006.01)

(52) U.S. Cl. .............................. 379/114.01; 379/114.23; 379/218.01

(58) Field of Classification Search ........... 379/114.01, 379/114.02, 114.03, 114.05, 114.09, 121.02, 379/121.03, 127.03, 127.05, 128, 114.23, 379/218.01
See application file for complete search history.

(56) References Cited

U.S. PATENT DOCUMENTS

| | | | |
|---|---|---|---|
| 5,479,491 A | 12/1995 | Herrero Garcia et al. ........................ 379/88.15 |
| 5,652,789 A | 7/1997 | Miner et al. ............ 379/201.01 |
| 5,742,905 A * | 4/1998 | Pepe et al. .................... 455/461 |
| 5,850,433 A | 12/1998 | Rondeau ...................... 379/218 |
| 5,926,754 A | 7/1999 | Cirelli et al. ................ 455/414 |
| 5,940,483 A | 8/1999 | Shaffer ......................... 379/130 |
| 5,943,417 A | 8/1999 | Cox et al. .............. 379/266.02 |
| 5,943,611 A | 8/1999 | Molne .......................... 455/564 |
| 5,987,471 A | 11/1999 | Bodine et al. ........... 707/103 R |
| 6,000,031 A | 12/1999 | Bingaman et al. ........... 713/200 |
| 6,009,323 A | 12/1999 | Heffield et al. ........... 455/414.1 |

(Continued)

FOREIGN PATENT DOCUMENTS

EP         0823809         2/1998

OTHER PUBLICATIONS

International Search Report dated May 4, 2001.

(Continued)

*Primary Examiner*—Ovidio Escalante
(74) *Attorney, Agent, or Firm*—Sofer & Haroun, LLP

(57) ABSTRACT

A billing system is provided for a communication assistance system that provides access to information corresponding to a plurality of subscribers. The billing system and communication assistance system include a telephone switch for receiving calls from a plurality of requesters desiring access to the information corresponding to subscribers. A database stores the information corresponding to each of the subscribers, including their phone numbers. A billing record database is coupled to the switch and configured to store information corresponding to amount of time the requester was connected to each one of the subscribers. The communication assistance system provides instructions to the subscriber's service provider such that the subscriber is not billed for the call.

21 Claims, 20 Drawing Sheets

U.S. PATENT DOCUMENTS

| | | | |
|---|---|---|---|
| 6,055,430 A | 4/2000 | Cooper et al. | 455/445 |
| 6,108,646 A | 8/2000 | Mohri et al. | 707/1 |
| 6,320,943 B1 | 11/2001 | Borland | 379/112.01 |
| 6,751,299 B1 * | 6/2004 | Brown et al. | 379/88.18 |
| 6,870,921 B1 * | 3/2005 | Elsey et al. | 379/218.01 |
| 2002/0057788 A1 * | 5/2002 | Cox et al. | 379/265.01 |

OTHER PUBLICATIONS

International Preliminary Examination Report dated Nov. 27, 2002.

\* cited by examiner

INCOMING CALL INFORMATION RECORD 15

| NUMBER DIALED BY REQUESTER | PREFERRED LANGUAGE CODE FIELD | ORIGINATING PHONE NUMBER OF REQUESTER | REQUESTER SERVICE PROVIDER FIELD | FEATURE CODE |
|---|---|---|---|---|

FIG. 4

LISTING TABLE 52A

| WIRELESS PHONE NUMBER | |
|---|---|
| NAME | SPECIAL FEATURES CODE |
| DIRECTORY LISTED NAME | WAIN CONNECT FIELD |
| ADDRESS: | TYPE OF DATA FIELS |
|    STREET 1 | DATA SOURCE |
|    STREET 2 | NPA/NXX WIRELESS |
|    CITY | DEVICE CAPABILITY |
|    STATE | WAP |
|    ZIP | SMS |
|    ZIP + 4 | i-MODE |
|    COUNTRY | OTHER |
| DEFINED LOCALITY | SPECIAL ANNOUNCEMENT |
| WIRELINE PHONE NUMBER | GENERAL ANNOUNCEMENT |
| EMAIL ADDRESS | SPECIAL SERVICES |
| COMPANY | PRE-ANNOUNCEMENT |
| WIRELESS CARRIER | LICENSE PLATE |
| BILLING INFO | RATE PLAN |
|  |  |
|  |  |
|  |  |
|  |  |

FIG. 5A

PERSONAL CONTACT LIST 52B

CONTACT #1

CONTACT #2

CONTACT #3

CONTACT #4

FIG. 5B

UPDATED LISTING TABLE 52C

UPDATED CONTACT INFO

FIG. 5C

REJECTED UPDATED LISTINGS TABLE 52D

REJECTED UPDATE INFO

FIG. 5D

LISTING INDICATOR TABLE 52E

REQUESTER ID

- CONTACT ID#
- CONTACT ID#

FIG. 5E

CALL COMPLETION DATA TABLE 68

- NUMBER DIALED BY REQUESTER 60A
- DATA SOURCE OF THE REQUESTED LISTING 60B
- TYPE OF DATA 60C
- SERVICE REQUESTED 60D
- PREFERRED LANGUAGE 60E
- NPA/NXX OF DESTINATION NIMBER 60F
- OTHER LISTING TABLE (52A DATA) 60G

FIG. 8

CALL COMPLETION DATA PACKET 50

| 54 | • ORIGINATING PHONE NUMBER OF REQUESTER FIELD |
|----|---|
| 56 | • WAIN INFORMATION FIELD |
| 58 | • CLOSING PROMPT CODE FIELD |
| 59 | • PRE-ANNOUNCEMENT FIELD |

FIG. 9

COMMUNICATION ASSISTANCE SYSTEM AND METHOD

RELATED APPLICATIONS

This application is a divisional application of U.S. patent application Ser. No. 10/049,803, filed on Feb. 15, 2002 now U.S. Pat. No. 6,970,548, which is a National Stage Application of PCT Application No. PCT/US01/02366, filed on Jan. 24, 2001, which in turn claims the benefit of priority from U.S. Provisional Application No. 60/179,166 filed on Jan. 31, 2000, the entitled of which are incorporated herein by reference.

BACKGROUND OF THE INVENTION

1. Field of the Invention

The present invention is directed to a system and method, which allows a requester to contact a communication apparatus user, and in particular, to a system and method which provides wireless directory and other information assistance services.

2. Description of the Related Art

Despite the proliferation of wireless communication devices such as cellular telephones, pagers and the like, there currently exists no way to obtain a user's wireless telephone or pager identification number such as exists for traditional business and residential phone number information services, for example, by dialing "411" or by using a global communication network such as the Internet to access on-line "white pages."

In part, this lack of wireless apparatus information is due to the multitude of service providers offering wireless services, and the different methods by which the service providers store the wireless apparatus device identification numbers. This problem is also caused by the distribution arrangement entered into between many organization clients and the wireless apparatus service providers in which the wireless apparatus service providers allocate a block of apparatuses and wireless identification numbers to the client, without specifically tracking the particular individuals, such as employees, to whom those apparatuses have been distributed.

Typically, an organization client will be listed in the service provider's database as opposed to each individual holder of the wireless apparatus. As such, there currently exists no efficient way to determine the specific individual holder of a wireless apparatus in the context of an organization client.

In addition, there has traditionally been no market demand for the establishment of an information repository, such as a white pages directory, for wireless apparatus subscribers, because the wireless service providers have typically assumed that subscribers would not want their identification numbers published. This is primarily the result of the cost of receiving unwanted calls on their wireless devices due to typical billing arrangements in which the user of the wireless apparatus is billed for inbound, i.e., received calls and messages.

Current telephone assistance systems generally provide information to a requester or calling party for land based listings or subscribers to land-based service providers. Here a requester calls the system where there are greeted by a customer service representative who looks up the information on a land-based subscriber and conveys that information to the requester.

One drawback to the current telephone assistance system is that the listings available of land-based subscribers do not include a comprehensive listing of wireless subscribers. Because of certain concerns such as privacy issues surrounding wireless systems and both party billing, wireless service providers do not automatically post wireless phone number listings in the traditional directory assistance databases.

Another drawback to current telephone assistance systems is the failure to utilize meaningfully the period between the time the requested information is retrieved by a customer service representative and the time the requester receives the requested information. This period is referred to as the closing period where the directory assistance service provides a closing prompt to the requester. Typically, this closing prompt is a single recorded message such as the familiar "We are connecting you to NPA.nxx.xxxx. Thank you for using XYZ" where XYZ is the name of the service provider of the requester.

As a result, it is desirable to have a system and method which permits the efficient acquisition of data necessary to create and maintain a database which identifies the actual wireless apparatus holders and their identification numbers in a manner which allows for quick retrieval by an operator or other communications interface technologies such as, for example, WAP (wireless applications protocol), Internet search or voice recognition systems. Further, it is also desirable to have a system and method which allows a requesting individual to be connected to the wireless apparatus such that they can engage in communications with the wireless apparatus user in a manner which does not require the disclosure of the wireless apparatus identification number. As such, it is desirable to preserve the currently existing confidentiality of wireless apparatus identification numbers unless the wireless apparatus user authorizes disclosure of the identification number.

It is also desirable to create a system capable of meaningfully utilizing the closing period and thus adding to the functionalities offered by the closing prompt feature.

It is further desirable to have a system and method which allows a billing mechanism arranged so that the requesting individual pays for the cost of the call, page message and the like to the wireless apparatus user such that the wireless apparatus user does not incur any costs for the receipt of the inbound communication.

SUMMARY OF THE INVENTION

The present invention advantageously provides a system and method which facilitate the efficient acquisition of wireless service subscriber information, preferably wireless apparatus subscriber information, which allows for a specific correlation between the subscriber and the identification number of their responding wireless apparatus. Subscribers referenced throughout the application refer to any individual or business entry whose information is stored for retrieval by the system. The database of the present invention is preferably populated with information on these subscribers so as to formulate a database of wireless service subscribers or a wireless white pages, as well as land-based subscribers. The term subscribers does not refer to subscribers to this system, and although there are pay features available from the system, subscriber refers to any wireless and land-based service subscriber preferably ones that are willing to be or are already listed in this system database.

The present invention advantageously allows this subscriber information including, for example, their wireless apparatus data to be gathered via an electronic system such as a global computer network, for example, the Internet, via telephony-based systems such as voice and facsimile, and the like.

Additionally, the present invention provides a system and method for maintaining and updating of the subscriber information by offering an incentive based program where subscribers can access and correct or update their own data base entries in order to receive incentives such as free services or other promotional rewards.

To this end, when a listing is created for a subscriber, various pieces of information are collected by the system database and placed into appropriate listing table fields, allowing the system not only to maintain a wireless white pages but also to provides special features based on the additional information. This data includes, among other things: the name, directory listed name, address, defined locality, land line phone number and email address of the subscriber, the company the subscriber works for, the wireless carrier of the subscriber, the wireless number of the subscriber (such as his/her cell phone number), the wireless apparatus identification number (WAIN) connect field, special features such as group connect information, type of data, data source of listing, wireless (or non-wireless) identifier, special and General Announcement fields, pre-announcement information, special services information and license plate information.

The data source of the subscriber refers to where the system database received this subscriber's information, for example, wireless service providers, group connect accounts, personal contact list entries etc. Special and General Announcement fields refer to the closing prompt code fields which are selected for the subscriber to be played back before call completion and can possibly include cross-referencing to other services offered by the system. The closing prompt codes identify a corresponding closing prompt that is provided to a requester after a customer service representative responds to the requester. The directory listed name field enables the subscriber of a wireless apparatus to select a listing name other than the owner of the wireless apparatus actual name if they so choose.

In another embodiment of the present invention the system provides additional services beyond the wireless white pages. These services can include but are not limited to: directions, category searches based on subscriber listing field information, restaurant recommendations or reservations, movie tickets and scheduling, and preferred language services.

Additionally, the system is given some general information about the requester as well, such as information that is received when the call comes in. This information can include the originating phone number of the requester, the DNIS (Dialed Number Identification String) dialed by the requester, the requester's carrier and other similar information, and/or a preferred language based on the initial number dialed to enter the system.

The present invention also advantageously provides a system and method which allows a requesting individual to be connected to the wireless apparatus subscriber in a manner which does not divulge the wireless apparatus subscriber's identification number. Contact is preferably facilitated by a requester calling a nationwide information number in a manner similar to that employed with the traditional "411" system. However, instead of being provided with the telephone number and/or an opportunity to have their call completed to the wireless apparatus subscriber, the wireless apparatus subscriber's number is not divulged to the requester, and the call, message or the like is directly completed.

Alternatively, it is also within the contemplation of the present invention to complete a call between a requester and a subscriber, such that the subscriber's number is not disclosed to either the requester or the customer service representative. In this case, the system can mask the wireless apparatus identification number (WAIN) or any portion thereof from the customer service representative, while still providing the representative with the ability to complete the call. This feature provides added security to the subscriber's WAIN and prevents the customer service representative from accidentally revealing the subscriber WAIN to the requester.

The system and method of the present invention additionally provides a billing and revenue allocation process that allows the cost of the communication to the wireless apparatus subscriber to be borne by the requesting individual, i.e., the individual who initiates the communication.

In addition, the system and method of the present invention advantageously provides a mechanism, which allows a subscriber of the wireless service to receive a call pre-announcement, which identifies the requesting caller. The pre-announcement is preferably transmitted to the subscriber as an audio or text and data message which identifies the caller. One example of a text pre-announcement would be passing the phone number of the originating party to the destination wireless apparatus. In this manner, the subscriber is provided with the opportunity to accept and answer the call, or reject the call. In the case where the call is rejected, the caller receives a message from the system informing the caller that the subscriber has not accepted their call and is also preferably prompted to leave a message for the subscriber.

The system and method additionally provides a dynamically controlled closing prompt feature that selects an appropriate closing prompt from a variety of stored responses based on information from both the requester and the subscriber listing. This information includes closing prompt codes stored in the Special and General Announcement fields of the subscriber table; override module functions as specified by the system administration and information contained in the call completion data table. The call completion data table includes information such as the number dialed by the requester, the data source of the requested listing, type of data requested, service requested, preferred language or the NPA/NXX (Numbering Plan Area (area code)/(number exchange code)) of the destination number and/or additional fields as necessary. Utilizing the information from these sources, the present invention is able to produce a closing prompt targeted to a requester. The system then transmits the selected closing prompt as an audio or text or other multimedia message to the requester. This feature works to tailor the closing prompt to a particular caller, increasing the advertising and related promotional revenue capacity of the closing prompt feature.

Other features and advantages of the present invention will become apparent from the following description of the invention, which refers to the accompanying drawings.

BRIEF DESCRIPTION OF THE DRAWINGS

For the purpose of illustrating the invention, there are shown in the drawings several forms, which are presently preferred, it being understood, however, that the invention is not limited to the precise arrangements and instrumentalities shown.

FIG. 4 is a field diagram of an incoming call information record in accordance with one embodiment of the present invention;

FIGS. 5A–5E are diagrams of a first embodiment of tables used to create and organize the primary identification database in accordance with one embodiment of the present invention;

FIG. 8 is a field diagram of a call completion data table of a closing prompt module in accordance with one embodiment of the present invention;

FIG. 9 is a field diagram of a call completion data packet in accordance with one embodiment of the present invention;

DETAILED DESCRIPTION OF EMBODIMENTS OF THE INVENTION

System Structure

Figure 1:
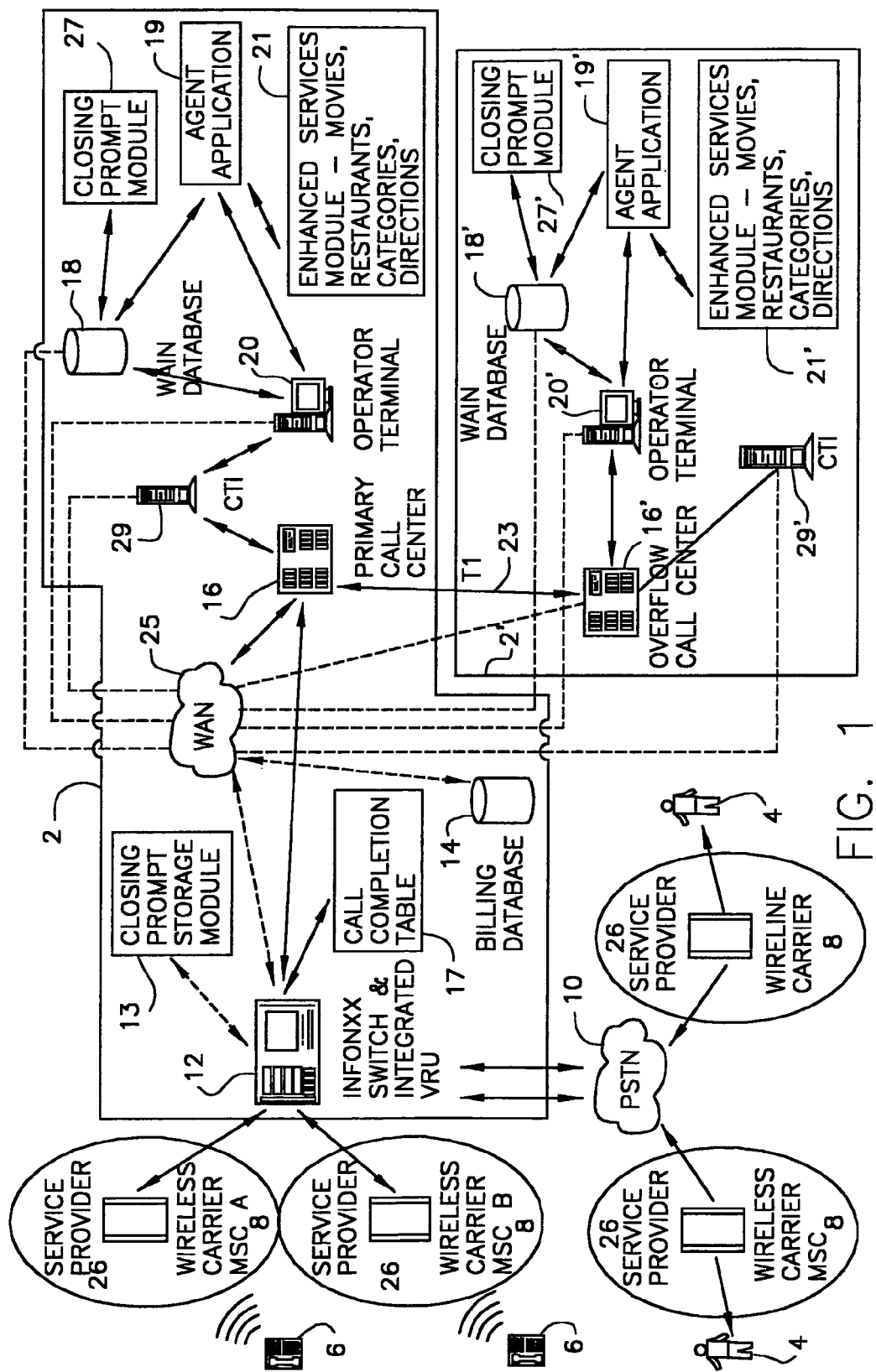
FIG. 1 is a diagram of a communication assistance system of the present invention in accordance with one embodiment of the present invention.

Referring now to the drawings, wherein like reference numerals refer to like elements, there is shown in FIG. 1, a communication assistance system 2 in accordance with one embodiment of the present invention. System 2 allows a Requester 4 to initiate communications with Wireless Apparatus 6, even where Requester 4 does not know the identification number of Wireless Apparatus 6. Wireless Apparatus 6 refers to a wireless device used by a subscriber to a wireless service, and will be used throughout the application to refer to the wireless apparatus that the Requester 4 intends to reach. Requesters 4 can access System 2 via a traditional wireline Local Exchange Carrier (LEC) and/or Inter-Exchange Carrier, via a wireless carrier (including both voice and data access) or via connection to the Internet. Wireless apparatuses 6 can be any known wireless communication device including cellular telephones and modems, pagers, PCS phones and modems, RIM Blackberry, wireless PDA, instant messaging devices, SMS devices and the like.

Although the present invention is described in terms of a system and method that accommodate wireless apparatuses, the invention is not limited to such. It is contemplated that the present invention can be implemented to accommodate any device including those for which a published identification directory does not exist, for example a Personal Digital Assistant (PDA) with voice communication capability, etc.

Communication Assistance System 2 is preferably coupled to one or more Service Providers 26 directly through the wireless MSC (Mobile Switching Center) 8 or via public switched telephone network (PSTN) 10.

In general, Wireless Apparatuses 6 communicate with System 2 via Mobile Switching Center (MSC)s 8 as shown in FIG. 1. Although not shown, it is contemplated that Wireless Apparatus 6 can communicate with System 2 via a MSC 8 coupled to PSTN 10. Similarly, Requester 4 can communicate with System 2 via a MSC 8 directly coupled to System 2, i.e., without the need to communicate via PSTN 10, as shown in FIG. 2.

As shown in FIG. 1, System 2 is preferably comprised of one or more switches and integrated voice response units (VRU) 12 (the VRU may be standalone instead of integrated as described above), Billing Databases 14, Primary Call Centers 16, Wireless Apparatus Identification Number (WAIN) Listing Databases 18 and a plurality of Operator Terminals 20 running Agent Application 19 accessing Enhanced Service Modules 21 that may be operated by an agent, Closing Prompt Storage Module 13, Call Completion Table 17, a Wide Area Network 25, Closing Prompt Modules 27 coupled to Agent Applications 19, and a Computer Telephony Interfaces 29. In particular, Billing Database 14 is connected to WAN 25 and can be coupled to any component of System 2. Units 12 are coupled to Mobile Switching Centers (MSCs) 8 and PSTN 10 as well as Primary Call Center 16. Primary Call Center 16 is also coupled to at least one Operator Terminal 20 and Wireless Apparatus Identification Number (WAIN) Listings Database 18.

The connection between Primary Call Center 16 and Operator Terminal 20 is such that voice communication is transmitted directly between the two and data information is transmitted via Computer Telephony Interface 29. This may also be accomplished via in-band signaling, as will be discussed below. Operator Terminal 20 is not only connected to the Wireless Apparatus Identification Number (WAIN) listing Database 18 but also to other databases and software application modules as well.

Figure 2:
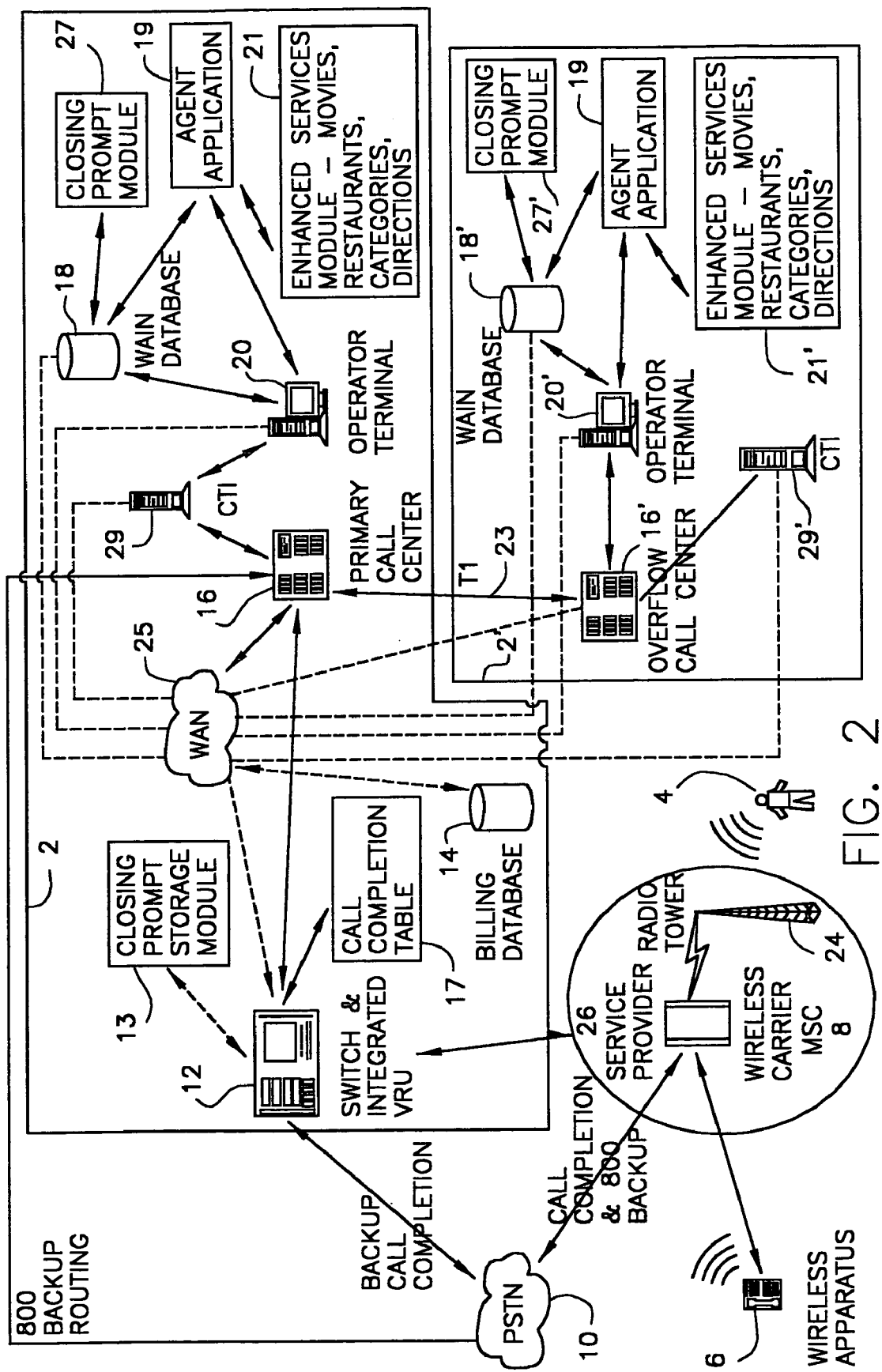
FIG. 2 is a diagram of an alternative example of the hardware configuration of a communication assistance system shown in FIG. 1 in accordance with one embodiment of the present invention.

FIG. 2 shows an alternative example of a hardware configuration of System 2 in accordance with another embodiment of the present invention. It is understood that the below-described operation and method are easily implemented using the hardware arrangement of FIG. 1 or any other hardware arrangement contemplated by one of ordinary skill in the art. While this is the preferred embodiment, it is contemplated that the operation of System 2 and the method of interaction between System 2 and Requester 4 does not rely on the inclusion of all of the elements described above.

As shown in FIG. 2, Primary Call Center 16 can be additionally coupled to PSTN 10 for backup call routing via PSTN 10. In addition, FIG. 2 shows an example of Service Provider 26 comprised of Radio Tower 24 and MSC 8. Of course, in the case where Service Provider 26 is a land based local exchange carrier, Radio Tower 24 is not necessary and wireless carrier MSC 8 may be any type of high capacity network switching device (the wireline carrier is depicted in FIG. 1). In the case that Service Provider 26 is a Voice Over IP provider (VoIP), Radio Tower 24 is unnecessary and Mobile Switching Center (MSC) 8 may be any type of device capable of transmitting calls with an IP protocol.

Figure 3:
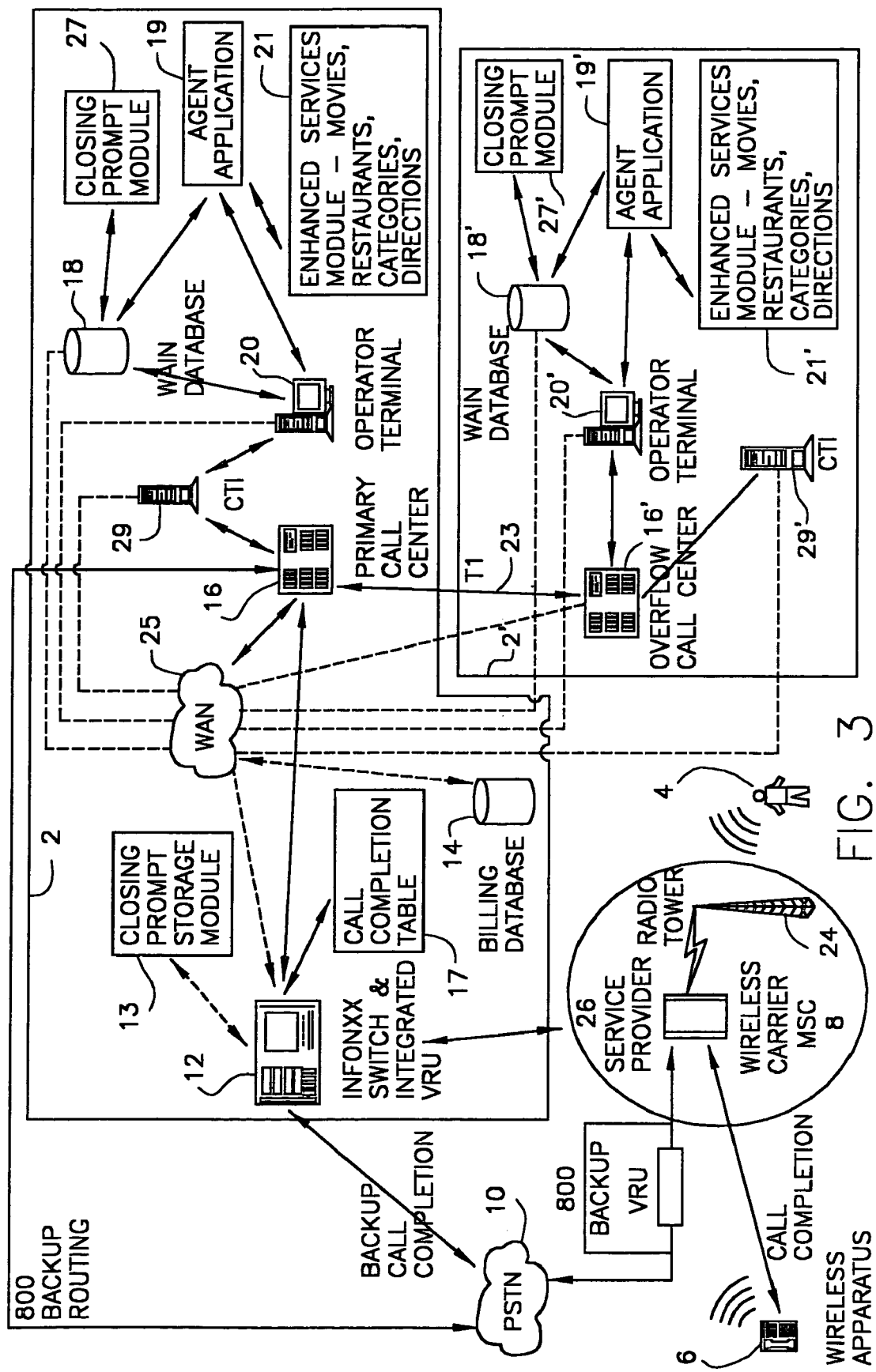
FIG. 3 is a diagram of another alternative example of the hardware configuration of a communication assistance system shown in FIG. 1 in accordance with one embodiment of the present invention.

In a preferred embodiment of the present invention a plurality of call centers such as System 2 and System 2', illustrated in FIGS. 1, 2 and 3, can be strategically located in various geographic locations across the country. For example, each call center, System 2 or System 2' can be located in a major metropolitan area spread across the United States. Each call center is configured to handle the call traffic that is designated for that call center which could include all possible type of calls.

Additionally, as reflected in FIG. 2, each System 2 or 2' can be connected to other call centers, such that all of the Systems 2 or 2' are connected. This connection can be achieved by the coupling of Primary Call Centers 16 of the various Systems 2 via high capacity telephone cables such as T1 Lines 23 or other comparable facilities including PSTN 10. It is also in the contemplation of this invention that these connections could be established through the use of a Virtual Private Network (VPN) or other comparable technology.

In operation, Primary Call Center 16' receives forwarded calls from Primary Call Center 16 in the case where System 2 is experiencing operational problems or a volume of requests that exceed its capacity. An important benefit provided by this arrangement is that the Primary Call Center 16' of System 2' is able to act as an overflow unit for Primary Call Center 16 of System 2 in the event that System 2 is experiencing technical difficulties or high call volume. This configuration allows Primary Call Center 16 to route calls to Primary Call Center 16' during periods of high volume, even in the event of a breakdown in the primary direct connections of System 2 as described above.

Another component of System 2 or 2' is Call Completion Table 17. Call Completion Table 17 allows Switch 12 to select an outbound trunk group that can most efficiently route the call to the end destination. For example, if Requester 4 requests a traditional directory assistance listing (i.e. a wireline business or residential listing), Service Provider 26 of Requester 4 may prefer to complete these calls on their own network. In this case Call Completion Table 17 would select an outbound trunk group to Service Provider 26 of Requester 4. In the case where Requester 4 requests a Wireless Apparatus Identification Number (WAIN) listing of a Wireless Apparatus 6, it may be more desirable to complete the call via the network of the Service Provider 26 of the Wireless Apparatus 6. In this case Call Completion Table 17 would select a direct outbound trunk group to Service Provider 26 of Wireless Apparatus 6.

Call Completion Table 17 also allows for the programming of multiple outbound routes for each call depending on, but not limited to, the time of day, the Service Provider 26 of the Requester 4, the Service Provider 26 of Wireless Apparatus 6, corresponding rates for each Service Provider and time of the day and the NPA/NXX of the destination.

Although not shown, it is within the contemplation of this invention that System 2' may contain a Switch 12' that would be connected to call centers 16'. It is noted that FIG. 2 illustrates some of the relevant modules of System 2' without showing all the components that are described in reference with System 2. Thus, for example, Call Center 16', along with Computer Telephony Interface 29', Operator Terminal 20', Wireless Apparatus Identification Number (WAIN) Database 18', Agent Application 19', Enhanced Service Module 21', T1 Lines 23' and Closing Prompt Module 27' of System 2' have been illustrated in FIG. 2.

WAIN Listing Database 18 and WAIN Listings Database 18' are similarly arranged, and are preferably mirror images of one another. Although Operator Terminal 20 is not shown directly coupled to Primary Call Center 16' and WAIN Listings Database 18', Operator Terminals 20 can be so coupled via WAN 25, or can access Call Center 16' and Database 18' via Primary Call Center 16 as shown in FIGS. 1, 2 and 3. This overcomes situations where Database 18 is down in System 2, such that Operator Terminal 20 completes the call using information stored on Database 18'.

This arrangement, for interconnecting all of the Systems 2 and 2', also allows for time shifting benefits such that some localities when experiencing low caller traffic can close for the evening allowing a System 2' located in an earlier time zone to handle the calls. For example, a call center System 2 in New York could close between the hours of 2 am and 6 am, and allow a call center System 2' in California or Hawaii to handle the calls. Not only does this allow for time shift, but it also allows for employment/staffing advantages by allowing the administrators of the service to hire personnel in areas where the conditions are most advantageous. For example, a call center System 2 on the east coast can route a significant portion of its call traffic to a Midwest call center System 2' located in an area where it is easier to staff and train the required number of employees.

The links coupling the various components of System 2 together and with Service Providers 26 via Mobile Switching Center (MSC) 8 and Public Switched Telephone Network (PSTN) 10 can be any known voice and/or data communication technologies, including wide area networking and local area networking communication technologies, for example, digital subscriber lines (DSL), digital T-1s, leased lines, satellite or wireless links, Integrated Services Digital Network (ISDN) circuits, asynchronous transfer mode (ATM), Ethernet, token ring, fiber distributed-data interface (FDDI) and the like. It is also presumed that the various components of System 2, Service Providers 26 and PSTN 10 are arranged with appropriate communication hardware interfaces to transmit and receive data across the communication links. For example, wireless Service Providers 26 may interface directly with System 2 via Mobile Switching Center (MSC) 8 hardware coupled directly to Switch 12 of System 2. Switches 12 can be any switches that preferably include an integrated voice response unit. Many functions performed by Switches 12 are known to those of ordinary skill in the art and include telephone call routing between trunks, converting one signaling type to another, such as between a digital signaling system, dual-tone multi-frequency (DTMF) signaling, multi-frequency (MF) signaling, ISDN, SS7, etc., and capturing call length and destination data for billing, etc.

As shown in FIGS. 1, 2 and 3, when a call comes into Switch 12, the call is identified by a DNIS which relates to the number dialed by the requester, so that appropriate data generated by System 2, such as Call Completion Data Packets 50 (FIG. 9), can be routed to the correct Switch 12 to complete the call, as will be explained in more detail hereinafter.

Upon the initiation of a call completion, Switch 12 is configured to pass the originating phone number of Requester 4 and/or the number dialed by Requester 4 to MSC 8 or PSTN 10 for delivery to Wireless Apparatus 6. This enables Wireless Apparatus 6 to screen in-bound calls.

Additionally, as shown in FIGS. 1 and 2, Switch 12 maintains an integrated voice response unit for use with a pre-announcement feature. After Switch 12 receives a Call Completion Data Packet 50 and reads the Pre-announcement field 59, Switch 12 is instructed on whether or not to implement the pre-announcement feature. If Pre-announcement field 59 is configured to deliver an announcement to Wireless Apparatus 6, Switch 12 will pass a message to Wireless Apparatus 6 indicating an incoming call with an attached announcement.

One possible embodiment of this invention would be to pass the number dialed by the Requester 4 from Switch 12 to Wireless Apparatus 6 to indicate an incoming announcement. One example of a possible announcement is to have Switch 12 initiate an audio request to Requester 4 for their message, preferably their name, such that the requester's name is recorded and transmitted to Wireless Apparatus 6 so that the subscriber using Wireless Apparatus 6 can determine in advance whether or not they wish to accept the call. Support for the "pre-announcement" message options are programmed in Switches 12 and control commands are indicated to Switches 12, as will be discussed in more detail hereinafter.

As shown in FIG. 3, if using release link trunking between Switch 12 and MCS 8, then the Voice Response Unit (VRU) for the pre-announcement may reside between MSC 8 and Wireless Apparatus 6. It is also contemplated by the current invention that this announcement may be initiated prior to the release of the call. For the purposes of this invention, Voice Response Unit (VRU) shall refer to any hardware and software combination that allows for the recording and/or delivery of voice messages.

For FIGS. 1, 2 and 3, the subscriber can indicate acceptance of the communication request in any appropriate manner, for example, by issuing a command or by doing nothing and waiting for the expiration of a predetermined time period. Conversely, issuing a command or taking no action can be used to reject a communication request. In the case where the subscriber does not wish to accept the communication request, Switch 12 can transmit a message to Requester 4 indicating that their communication request has been denied. Additionally, System 2 may prompt Requester 4 to record a message to be delivered to and/or retrieved and replayed by the subscriber of Wireless Apparatus 6. Preferably a fee is charged for this recording service. Optionally, the subscriber of Wireless Apparatus 6 can record a message to be delivered to Requester 4.

Alternatively, if Service Provider 26 supports such a feature, the "pre-announcement" feature can be provided based on the originating phone number of Requester 4 such that instead of Wireless Apparatus 6 receiving a "pre-announcement" voice recording they receive a text message displaying Requester 4's phone number, or additional information such as name if available. This information provides Wireless Apparatus 6 with adequate information to determine if they wish to accept a call or not. Using the same acknowledgment method as stated above, Wireless Apparatus 6 could accept or decline to connect with Requester 4.

Additionally, as shown in FIGS. 1, 2 and 3, a Closing Prompt Storage Module 13 is configured to store a variety of closing prompt messages and data, such that when the Switch 12 completes the call from Requester 4 to Wireless Apparatus 6, Switch 12 can play any one of a variety of closing prompts based on the information received from a Call Completion Data Packet 50 as will be explained in more detail. Although only one Switch 12 is illustrated in FIGS. 1, 2 and 3, any number of Switches 12 can be used in System 2 to increase the capacity of System 2.

FIG. 4 illustrates an Incoming Call Information Record 15 provided by Switch 12, after Switch 12 receives a call from Requester 4, Record 15 is sent to Primary Call Center 16.

In accordance with one embodiment of the present invention, Incoming Call Information Record 15 contains a number of fields which may include but is not limited to: Number Dialed by Requester field, Preferred Language Code field, Originating Phone Number of Requester field and Requester Service Provider field and Feature Code field.

The Number Dialed by Requester field contains the number dialed by the Requester and may be used to identify the originating switch location of the incoming call.

The Preferred Language Code field contains information indicating the language preference of Requester 4. System 2, and in particular Switch 12, maintains the ability to translate many different dial strings into System 2. One possibility for determining the preferred language of Requester 4 is to automatically route calls from a particular dialed number, for example NPA-555-1818, directly to, for example, Spanish speaking operators. The Preferred Language Code field is used to route calls to Primary Call Center 16 via Switch 12 by way of Incoming Call Information Record 15.

The Originating Phone Number of the Requester field holds the originating phone number of the Requester 4. The Requester Service Provider field conveys the service provider of Requester 4. This field allows System 2 to identify the calling party's Service Provider 26 for use with various functions such as introduction prompts, closing prompts, billing information, usage tracking, etc. One example of a use of this data is to allow for the settlement of billing charges between the Service Provider 26 of Requester 4 and Service Provider 26 of Wireless Apparatus 6.

The Feature Code field holds information that can be used to identify any special features associated with Requester 4's device. These features could include, but are not limited to: promotional rate plans, standard rate plans, bundled service plans, device capabilities and the like. For example, Service Provider 28 may offer unlimited Directory Assistance for a flat fee per month, or could offer services free for a promotional period.

Although only five fields are identified for Incoming Call Information Record 15, any number of fields that are used to provide System 2 with the necessary data to complete a call is within the contemplation of this invention.

As shown in FIGS. 1, 2 and 3, Billing Database 14 is used as the repository for the billing data and includes but is not limited to: records which are preferably comprised of the call date, the call start time, the call end time and the resulting time, i.e. the call length, the originating phone number for Requester 4, the Wireless Apparatus Identification Number (WAIN) for Wireless Apparatus 6 and fields which identify the originating and terminating service providers. The billing data can be accumulated from any of, but not limited to, the following: Switches 12, ACDs, PBXs, Agent Application 19 and/or Database 18.

Call centers 16 and 16' are comprised of hardware and software which accept inbound calls from Switches 12 and which distribute the calls to multiple Operator Terminals 20 using standard Automatic Call Distribution (ACD) technology. Operator Terminal 20 interacts with Database 18 to search for and retrieve a WAIN corresponding to Wireless Apparatus 6. The search can be done using a single field or combination of fields, defined in Tables 52A through 52E as discussed below.

Call center 16 and 16' can be comprised of one or more processors coupled together in a networked arrangement to accomplish these functions, and can be constructed using known computing technology such as using personal computers, mini or mainframe computing devices, routers, switches and the like. Because the arrangement and operation of call centers 16 and 16' are similar, discussion of Primary Call Center 16 is understood to also describe Primary Call Center 16'.

Computer Telephony Interface (CTI) 29 is disposed between call center 16 and Operator Terminal 20. CTI 29 is configured to route the data portion of an incoming Requester 4 call, such as the number dialed by the requester and the originating phone number of the requester to Operator Terminal 20, while the voice portion of the call is transmitted directly between call center 16 and Operator Terminal 20. While not discussed here, it is contemplated within the context of this invention that the data portion of an incoming Requester 4 call could be sent to Operator Terminal 20 using in-band signaling (i.e., with the voice path of the call) as well.

Operator Terminal 20 can also be any known computing device capable of receiving and displaying data on its display, including but not limited to a personal computer, UNIX workstation and the like. Although it is preferred that a separate customer service representative telephone be implemented as part of System 2 and coupled to Primary Call Center 16 for communicating with Requester 4, Operator Terminal 20 is not limited to this arrangement. For example, Operator Terminal 20 can be arranged to contain an integrated telephone (as shown). In other words, any arrangement that allows a customer service representative to engage in oral communications with Requester 4 is sufficient. In addition, although only a single Operator Terminal 20 is shown, System 2 is not limited to this arrangement. It is contemplated that System 2 is comprised of multiple Operator Terminals 20 such that more than one customer service representative is available to accommodate the users of System 2. It should be noted that Primary Call Center 16 and its communication with Switches 12, Operator Terminal 20 and Database 18 as well as the arrangement and communication between Primary Call Center 16' and Switches 12' can be implemented in accordance with the connectivity and communication techniques described in U.S. patent application Ser. No. 09/449,126, filed Nov. 24, 1999, the contents of which are incorporated herein by reference. In an alternate embodiment of this invention it is contemplated that a Requester 4 may interact with an agent using a non-voice method such as, but not limited to: Short Messaging Service (SMS), Wireless Application Protocol (WAP), Live Chat, and Instant Messaging as will be discussed below.

Agent Application 19 platform is used to operate Operator Terminals 20 and Databases 18. This system not only supports the communications between these modules but also prepares a Call Completion Data Packet 50 that is to be sent to Switch 12 to ultimately complete the call.

To create Call Completion Data Packet 50, Operator Terminal 20 and Agent Application 19 require information to be retrieved from Database 18. This data is used to populate the various fields of Call Completion Data Packet 50 as discussed in more detail below.

Database 18 is preferably any known database system which can be programmed to store all of but not limited to the following: wireline telephone directory listings, originating Service Provider 26 of Requesters 4 listings, WAIN listings and other listings such as providers of goods and services. Database 18 preferably supports multiple database tables for a voluminous quantity of listings and multimedia data associated with each user or organization that is sponsoring a group of users.

It should be noted that the present invention augments the database tables described in U.S. patent application Ser. No. 09/449,126 by including several additional fields to support new features as discussed herein.

Database 18 can be based on any known database software and any known database format. The hardware configuration of Database 18 can be any hardware platform capable of supporting the quantity of users and entries in their respective database tables. As such, Database 18 can be stored on any device capable of storing the information.

Those of ordinary skill in the art can appreciate that although Database 18 is shown as a single unit, it is not limited to this configuration. Database 18 can be comprised of multiple hardware units, i.e., central processing units and/or storage devices such as CD-ROMs, hard disk drives, tape disk drives, etc. which can communicate with each other across a transmission link. In addition, while only specific tables and fields within Database 18 are discussed in detail, the current invention does not limit the table schema in Database 18. In accordance with one embodiment of the present invention each database in System 2 or System 2' such as Database 18 or 18' stores the same information. In an alternate embodiment, it is also contemplated that Database 18 can take the form of a distributed database. For example, users who are primarily based on the west coast can be supported from a portion of database such as Database 18' located in California, while users primarily located on the east coast can access a portion of database such as Database 18 located in New York.

In one embodiment of the present invention, Database 18 stores a branded audio message associated with the Service Provider 26 of the Requester 4 such that when Requester 4 accesses System 2, the audio welcome message is retrieved by Operator Terminal 20 and played to the Requester 4. In another embodiment of the present invention the audio welcome message may be retrieved and played on Call Center 16 or Switch 12. This welcome audio message is discussed in detail below.

As illustrated in FIG. 5A, Listing Table 52A stores Wireless Apparatus Identification Number (WAIN) listings (i.e. information about each Wireless Apparatus 6). This WAIN listing information includes, but is not limited to: the wireless phone number, name, the directory listed name, address, Defined Locality, company, wireless carrier, billing information, special features code, WAIN connect field, type of data field, data source field, NPA/NXX wireless field, device capability field, special announcement field, General Announcement field, special services field, pre-announcement field, wireline phone number field, e-mail address fields, license plate fields and other codes used in System 2 to populate various fields of Call Completion Data Packet 50. Listing Table 52A represents the primary Wireless Apparatus 6 table in System 2 and includes any additional special instruction information listings including information for populating Closing Prompt Module 27.

The Wireless Phone Number field of Listing Table 52A identifies the phone number of Wireless Apparatus 6, for example a cell phone number. The Name field represents the actual name of the subscriber for Wireless Apparatus 6. The Directory Listed Name field represents the chosen listing name for Wireless Apparatus 6. For example, this field could hold the subscriber's real name, nickname or the chosen alias for the subscriber. The Address fields of Listing Table 52A are contemplated to contain one or more addresses that contain one or more of the following fields: street address 1, street address 2, city, state, country, zip code and zip +4 address of the subscriber for Wireless Apparatus 6.

The Defined Locality field identifies the subscriber's preferred locality or combination of localities. For example, the subscriber based in NYC with a New Jersey area code on his or her Wireless Apparatus 6 may elect to use NYC, New Jersey, NY Metro area or some other designation for location.

The Company field of Listing Table 52A identifies the company for which the subscriber of Wireless Apparatus 6 works. The Wireline Phone Number field identifies one or more wireline phone numbers of the subscriber associated with Wireless Apparatus 6. The Email Address field identifies one or more email addresses of the subscriber identified with Wireless Apparatus 6. The Wireless Carrier field of Listing Table 52A identifies the Service Provider 26 for Wireless Apparatus 6. This information can be used in conjunction with the closing prompt feature as well as billing and other related features.

The Billing Information field of Listing Table 52A contains information specific to Wireless Apparatus 6 which will support the billing function. This field provides System 2 with the specific billing instructions for Wireless Apparatus 6 including the service provider information as well as special service subscriptions. For example, the subscriber of Wireless Apparatus 6 may elect to incur charges on incoming calls. In this case, the Billing Information field would indicate that Requester 4 is not responsible for the cost of the inbound call to Wireless Apparatus 6.

The Special Features Code field of Listing Table 52A identifies any particular special features that may be associated with the subscriber's account. This includes information such as group connect features, where a large employer distributes a number of phones company-wide. In such instances, a single billing party may have several or even hundreds of wireless accounts under one name, such that the actual individuals who use the wireless devices do not appear on the listing. Information in this field can be used for category searches, such as all employees at company XYZ; special billing codes; or possibly for use in closing prompt selection, if one is not already specified by Wireless Apparatus 6.

Figure 6:
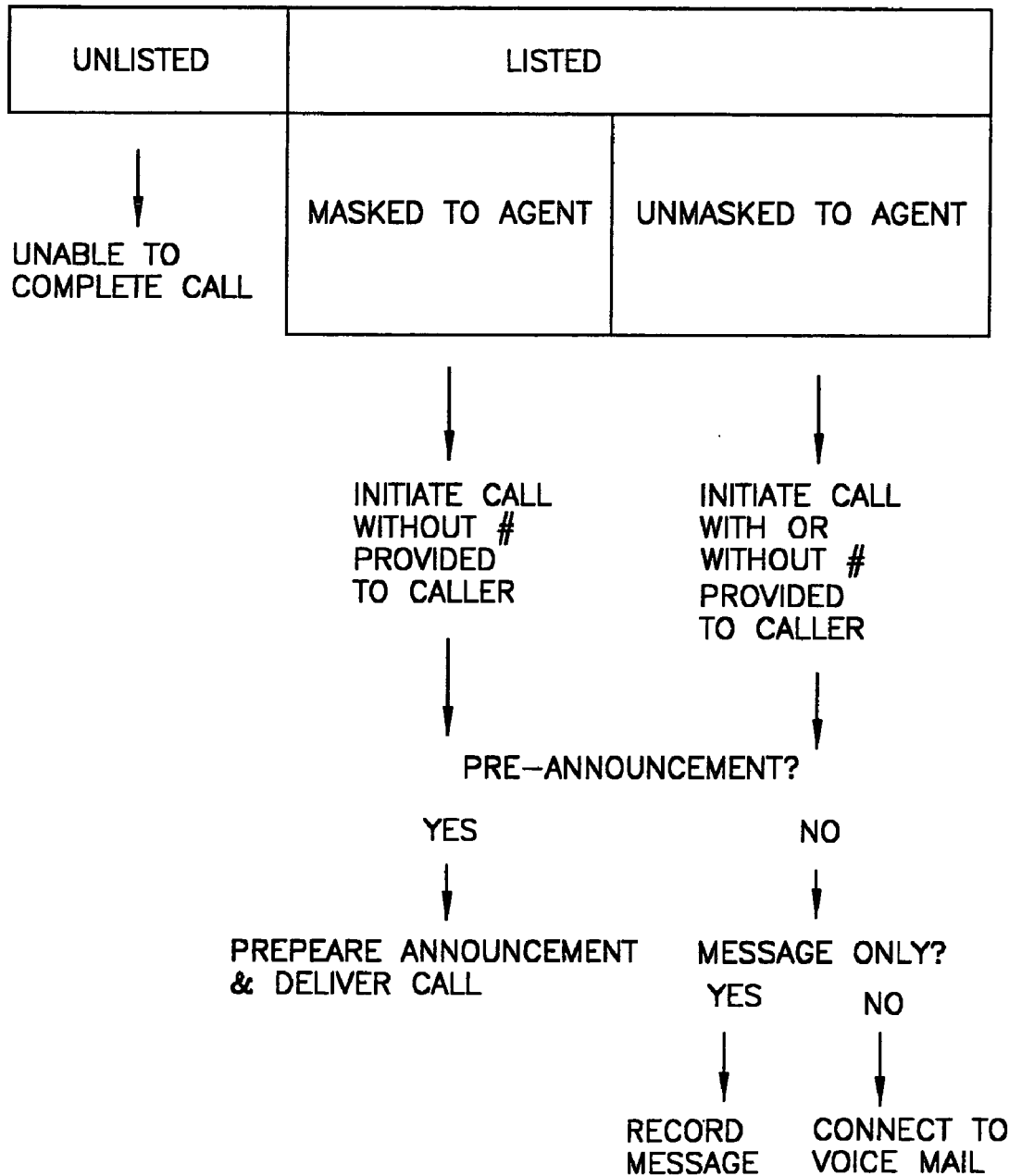
FIG. 6 is a field diagram of the Wireless Apparatus Identification Number (WAIN) connect field of a listing table illustrated in FIG. 5A in accordance with one embodiment of the present invention.

The Wireless Apparatus Identification Number (WAIN) Connect field of Listing Table 52A identifies the degree of availability of the listing for disclosure. As illustrated in FIG. 6, the WAIN Connect field consists of a WAIN Connect Field Sub Table Listing 70, which categorizes a number first as either listed or unlisted. If a number is unlisted it cannot be used to complete a call. However if the number is listed, WAIN Connect Field Sub Table Listing 70 is further subdivided into "unmasked to agent" or "masked to agent". In the case of "masked to agent", a call can be completed but Requester 4 does not receive the number. In this case, the number or any portion thereof may be masked to the agent or customer service representative as well, such that the agent will not have access to the number, and the call is simply connected. In the case of "unmasked to agent", the subscriber for Wireless Apparatus 6 has authorized System 2 to reveal the number to the agent and/or Requester 4 as would most likely be the case for business wireless devices.

The Type of Data field of Listing Table 52A identifies the type of wireless device that is being listed in the Wireless Apparatus Identification Number (WAIN) listings table.

The Data Source field of Listing Table 52A identifies the data source from which the Wireless Apparatus 6 listing originated. This field provides information to System 2 identifying the source of this listing such as a service provider or any other entity, for example a third party or the subscriber of Wireless Apparatus 6 that supplied the data contained in Database 18, and can be used in conjunction with such features as the closing prompt or with bonuses or incentives.

The NPA/NXX Wireless Field of Listing Table 52A identifies whether or not Requester 4 is using a wireless device or landline device. This field is used to turn on and off certain features which may only be available to either wireless or land based phones. For example, as discussed above, the pre-announcement field may be defaulted to "no" for Wireless Apparatus 6 from land-based phones whereas the pre-announcement field may be defaulted to "yes" for calls to Wireless Apparatus 6 from wireless phones.

The Device Capability field of Listing Table 52A identifies the capabilities of Wireless Apparatus 6 device. It is contemplated that these capabilities may include: SMS, WAP, iMode, etc., capabilities.

The Special Announcement field of Listing Table 52A and/or Database 18 identifies if there are any particular special closing prompts paid for or requested by either Wireless Apparatus 6 or a preferred provider to be used by Closing Prompt Module 27. For example, if a subscriber of a Wireless Apparatus 6 has elected not to pay for incoming call charges, an announcement can be played to Requester 4 indicating that they will be billed for the call. In another example, a preferred provider can elect to have a customized prompt played whenever calls are connected to that listing. A preferred provider is any subscriber who elects to offer incentives to Requesters 4 and/or the provider of System 2 to direct calls to them.

The Special Announcement field of Listing Table 52A and/or Database 18 is also used to cross-reference other services provided by System 2. It is contemplated in the current invention that System 2 shall be enabled to provide traditional directory assistance as well as enhanced traditional directory assistance which includes but is not limited to additional services such as: restaurant recommendations and reservations; movie times and ticket purchase; category searches; alternate language services, directions services, and preferred provider opportunities.

The Special Announcement field is intended to enable the cross referencing of announcements and/or closing prompts to direct Requester 4 to other services offered by System 2. These messages can be tailored as well to provide precise information on the availability and extent to which those services are offered. It should be noted that cross-referencing codes found in the Special Announcement field can be used alone or in combination with designed closing prompts. For example, a restaurant preferred provider may request a special closing prompt suggesting a promotional discount or other such restaurant related comments to Requester 4 in response to a request by Requester 4 for traditional directory assistance or a restaurant category search. In this case, if a preferred provider designs a particular closing prompt, the code will be stored in this field. It is also possible to store multiple codes, third parties are not limited to one Special Announcement code but can use as many as desired.

The General Announcement field of Listing Table 52A and/or Database 18 identifies if there are any general closing prompts attached to Wireless Apparatus 6's listing to be used by Closing Prompt Module 27. This field is similar to the Special Announcement field; however, the closing prompts called for here are not specifically tailored to the Wireless Apparatus 6. The codes listed here may trigger closing prompts that are canned. For example, in the preferred provider example above, a restaurant which does not accept credit cards may, instead of designing a unique closing prompt that would be coded under the Special Announcement field, choose from some canned closing prompts such as, "this restaurant does not accept credit cards". This example or other general announcement closing prompts would be coded for in the General Announcement field of Listing Table 52A and/or Database 18.

Similar to the Special Announcement field, the General Announcement field also allows for the use of multiple codes and also allows cross-referencing of other System 2 services. For example, if the same preferred provider restaurant offered reservations, it may wish to include a cross referencing closing prompt in their General Announcement field. Unlike the Special Announcement field, the cross referencing prompt would not be specifically tailored to the restaurant but instead would be of more generic variety.

The Special Services field of Listing Table 52A and/or Database 18 identifies any special services that a third party may provide. This field is used when performing category searches when a Requester 4 wishes to direct their search for certain abilities or conditions, such as: open 24 hours, Spanish speaking, hearing impaired compatible etc. For example, if a Requester 4 asks for all Spanish-speaking restaurants in the area, when Operator Terminal 20 searches Database 18, the only listings that will be retrieved will have a Spanish speaking code in the special service field.

The Pre-Announcement field of Listing Table 52A identifies if the subscriber of Wireless Apparatus 6 wishes to have any incoming calls pre-announced. This field determines whether there is preference for voice or text or multimedia pre-announcements assuming the service provider for Wireless Apparatus 6 supports the appropriate formats. If both formats are not supported the Pre-announcement field will default to whatever is supported by the service provider. If a preference for a voice pre-announcement is indicated or if the service provider can only support a voice pre-announcement, it is contemplated by this invention that this field will include but not be limited to the following four options: connect call with pre-announcement, connect call without pre-announcement, connect call only to Wireless Apparatus 6's voicemail, and connect call to a System 2 temporary voicemail device (VRU). In the event that the subscriber of Wireless Apparatus 6 chooses message delivery only, it is contemplated by this invention that the temporary voicemail device (VRU) will prompt Requester 4 to record and store a message, and will then attempt to deliver the message to Wireless Apparatus 6. Once Requester 4 indicates that he/she has accepted the message recorded, the call will be disconnected. If a preference for a data and/or text pre-announcement is indicated or if the service provider can only support a data and/or text pre-announcement, it is contemplated by this invention that this field will include but not be limited to the following one option: connect call with data and/or text pre-announcement. It is contemplated by this invention that this option shall specifically include the conversion of a recorded voice message to text and the delivery of that message via any of but not limited to the following formats: SMS, WAP, iMode, instant messaging, etc.

The License Plate field of Listing Table 52A contains the License plate of the primary vehicle associated with the subscriber of Wireless Apparatus 6. This information can be used to associate a subscriber with one or more vehicles in which they may be traveling.

It is contemplated by the current invention that Operator Terminal 20 will have the ability to perform searches on any one field or combination of fields in Listing Table 52A and/or Database 18. This includes but is not limited to locating WAIN listings by email address, defined locality, directory listed name, address, company, name, wireless carrier, license plate, wireline phone number and/or even a reverse search listing by WAIN.

Finally, the Rate Plan field of Listing Table 52A contains the rate plan of Wireless Apparatus 6. This information is used to determine things such as if roaming charges will apply, if long distance charges will apply and the number of monthly minutes associated with the plan.

In another embodiment of the present invention, Personal Contact List 52B is provided to add a feature to System 2 allowing subscribers of Wireless Apparatus 6 to provide their contact list to Database 18 allowing them easy access to a collection of wireless numbers and other information. As a result the numbers provided by the contact list are entered into Personal Contact List Table 52B.

In addition to storing personal contact lists of subscribers for their access only, System 2 can request that a subscriber release the phone information on all of the contact list members so as to further populate Database 18. This only requires the release of telephone data and not the full content of contact list information which can also include personal information such as birthdays, etc. If the subscriber of Wireless Apparatus 6 consents, the phone information from his/her contact list is added to the WAIN listings in Database 18. As a result, the subscriber of Wireless Apparatus 6 benefits by having a saved personal contact list and System 2 benefits by getting additional WAIN listings for Database 18. FIGS. 5B–5E illustrate Database Tables 52B–52E that demonstrate the contact list feature and maintenance.

To encourage subscribers to send in their phone lists, System 2 can provide bonuses, incentives or free services in exchange for submitting a contact list for use in Database 18, as described in more detail below.

As illustrated in FIG. 5B, Personal Contact List Tables 52B preferably store contact names and numbers for each corresponding Wireless Apparatus 6. The Wireless Apparatus 6 personal contact list table is arranged to have additional information about each contact, such as electronic and surface mail addresses, job title, company name, company address, facsimile telephone number, home web page, birthday, and the like. Each entry in a contact list is assigned a unique identification number.

As illustrated in FIG. 5C, Updated Listing Tables 52C store updated contact listings information which is to be added, deleted or revised for a subscriber of Wireless Apparatus 6 contact list in System 2. These changes are then incorporated into Personal Contact List Table 52B.

Changes are preferably verified prior to incorporation into the subscriber's Personal Contact List Table 52B. For example, users attempting to synchronize their "personal contact databases" with their Personal Contact List Table 52B initiate a synchronization process, as discussed in detail below. These changes are not incorporated into the user's personal contact list until the user's authenticity has been verified. Once the requested change has been verified for accuracy, (i.e. the requested change is not a duplicate of a previous request) such change request will be incorporated into subscriber's Personal Contact List Table 52B.

As illustrated in FIG. 5D, those requested changes which cannot be implemented are stored in Rejected Updated Listings Tables 52D along with a reason for the rejection, for example, that the user is an invalid user, and/or that the requested changes is a duplicate, and the like.

As illustrated in FIG. 5E, the Listing Indicator Table 52E tracks the listing identification numbers assigned to each entry in a subscriber's Personal Contact List Table 52B. Listing Indicator Table 52E is used to track the listing identification numbers to ensure that a unique identification number is assigned. This facilitates future updates, deletions, etc., and also ensures that entries can be made from multiple sources (i.e., a web browser, Operator Terminal 20, PDA (Personal Digital Assistant), and/or personal contact software and the like) without creating duplicate listing identification numbers.

It should be noted that although the field description as discussed above was for WAIN Listings Database 18, WAIN Listings Database 18' preferably operates with substantially similar field structure.

Tables 52A–52E for WAIN Listing Databases 18 and 18' are configured not only to store subscriber information but also to provide System 2 with the ability to properly handle feature requests. For example, information stored in the Special Features Code field in Listing Table 52A allows System 2 to provide features such as preferred language and targeted advertising promotion.

In addition to providing a wireless white pages service supported by Database 18 other services are available through System 2. For example, a directions unit within Enhanced Services Module 21 provides System 2 with a means to send directions to a Requester 4. A Directions unit is incorporated in the Enhanced Services Module 21 used by Agent Application 19 running on Operator Terminal 20 and allows a customer service representative to retrieve directions and transmit them to Requester 4. The Directions feature in Enhanced Services Module 21 may be a stand alone unit that is configured to calculate directions based on a starting and a destination address, or other criteria as currently known in the industry. In accordance with another embodiment of the invention, Enhanced Services Module 21 may be connected via a communications channel, for example, Internet, to a remote directions calculating unit operated by a third party such as those available by MAPQUEST™.

In another example, restaurant reservations are also integrated into the Enhanced Services Module 21 used by Agent Application 19 running on Operator Terminal 20 and provide System 2 with the ability to secure reservations and provide recommendations for restaurants to a Requester 4. Reservation services are activated when the subscriber such as restaurant or other related service provider, such as a caterer, activates the reservations services at Enhanced Services Module 21 of System 2. The Reservations feature in Enhanced Services Module 21 may be a stand alone unit that is configured to arrange reservations based on up-to-date information received from a participating restaurant, or other criteria as currently known in the industry. In accordance with another embodiment of the invention, Enhanced Services Module 21 may be connected via a communications channel, for example, Internet, to a remote reservations service system operated by a third party.

Recommendations are activated when a subscriber such as the restaurant or a restaurant recommendation service decides to place its information in a recommendation index found within restaurant reservation and recommendation system in Enhanced Services Module 21.

In a third example, movie ticket and schedule software is incorporated into the Enhanced Services Module 21 used by Agent Application 19 running on Operator Terminal 20 and provides System 2 with the ability to provide movie information and ticket purchasing. These services are activated when a subscriber such as a movie theater, playhouse or other related business, or a movie information provider provides the information to System 2.

Closing Prompt Module 27 provides the closing prompt identification data that will be included in a defined field such as Closing Prompt Code field 58 of the Call Completion Data Packet 50 as shown in FIG. 9. As mentioned, Call Completion Data Packet 50 prompts Switch 12 with a command to activate the appropriate closing prompt. Closing Prompt Module 27 functions in conjunction with Agent Application 19 to generate a Call Completion Data Packet 50 as more fully described below in reference to FIG. 9. Call Completion Data Packet 50 presents information to Switch 12 to generate a closing prompt based on Closing Prompt Code field 58 of the Call Completion Data Packet 50, which is recognized by Switch 12. Closing Prompt Module 27 can either exist as a physically separate unit or it can exist as a functional module of Agent Application 19 software.

While one embodiment of the invention has been described above, the invention contemplates that Call Completion Data Packet 50 can be used by any combination of hardware and software such as: an ACD, a PBX, a standalone VRU(Voice Response Unit)/ASR(Advanced Speech Recognition), application software and the like, to generate the closing prompt based on the Closing Prompt Code field 58 in Call Completion Data Packet 50.

Figure 7:
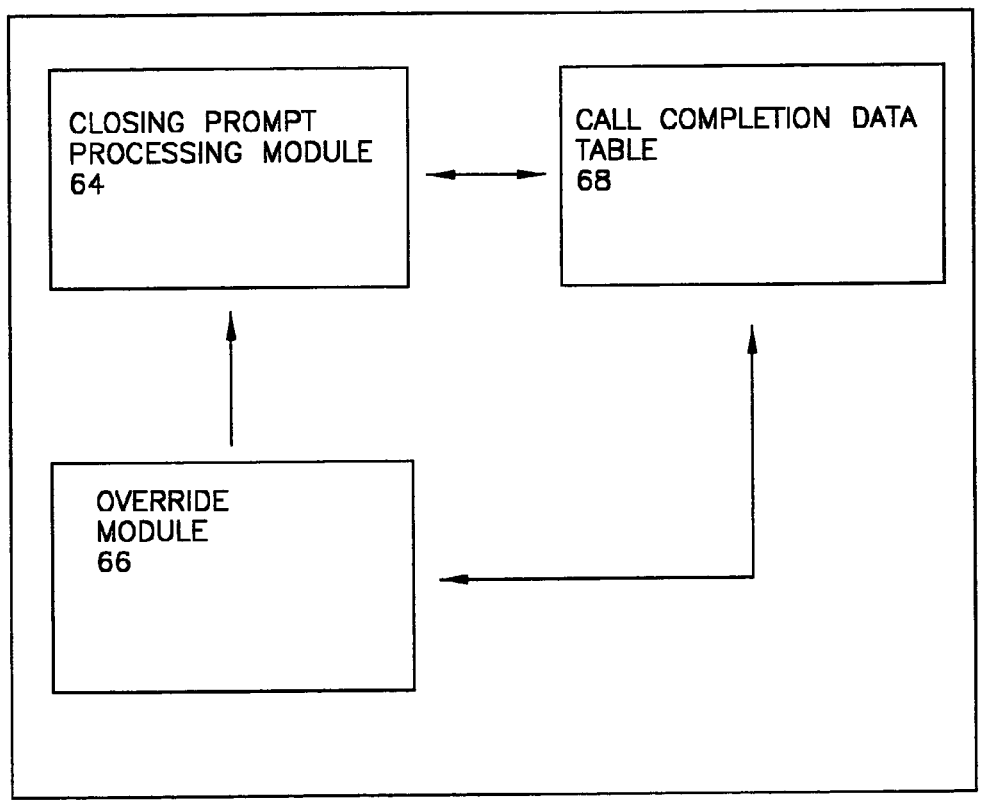
FIG. 7 is a diagram of a closing prompt module in accordance with one embodiment of the present invention.

As illustrated in FIG. 7, Closing Prompt Module 27 is comprised of a Closing Prompt Processing Module 64, Override Module 66 and a Call Completion Data Table 68. Call Completion Data Table 68 can either be a separate table within Closing Prompt Module 27 or it can exist as software that is found in Closing Prompt Processing Module 64. In another embodiment of the current invention, Closing Prompt Processing Module 64 and Override Module 66 can reside on Switch 12 or any combination of hardware and software such as: an ACD, a PBX, a standalone VRU/ASR, application software and the like.

In order to appropriately populate the Closing Prompt Code field 58 of Call Completion Data Packet 50, Closing Prompt Module 27, in conjunction with Agent Application 19, checks the retrieved listing in Listing Table 52A and/or Database 18. Closing Prompt Module 27 uses the retrieved listing to populate some of the fields in Call Completion Data Table 68. The remainder of the fields in Call Completion Data Table 68 can be populated from Database 18 and/or the agent application. In one embodiment of the current invention, Call Completion Data Table 68 includes but is not limited to the seven fields 60A–60G as shown in FIG. 8. Closing Prompt Module 27 also uses the Special Announcement and General Announcement fields of Listing Table 52A and/or other fields from Database 18, Closing Prompt Processing Module 64, Override Module 66 and Call Completion Data Table 68 to determine the appropriate information to populate in Closing Prompt Code field 58, and other fields of Call Completion Data Packet 50.

While the current invention contemplates that Closing Prompt Module 27 may use any of the information in these fields and modules in any order, the following outlines one possible method of selecting a closing prompt.

The first step is to retrieve the listing that was selected from Listing Table 52A and/or Database 18. In the event that the listing was not found, this information will be considered sufficient.

The next step is for the Closing Prompt Processing Module 64 to look to the Special Announcement field and General Announcement field of Listing Table 52A to determine if any specific closing prompts are active for Wireless Apparatus 6. If so, at least one closing prompt code will be found in one of these fields and possibly many codes will be found.

Next, Closing Prompt Processor Module 64 checks with Override Module 66 to determine if any closing prompt override functions are present. The information for this module comes from both Listing Table 52A and/or Database 18 and from internal System 2 settings. For example, Override Module 66 may provide for time of day functionality such that certain closing prompts are initiated at certain times of day. In the case of restaurant services, dinner prompts may be preferred in the evening hours whereas breakfast prompts may be preferred in the morning hours.

Another sample function of Override Module 66 is to set default prompts based on the day. For example, recreational prompts may be set to activate only on weekends whereas business prompts may only activate on weekdays. Yet another sample feature of Override Module 66 is to cross-reference other services offered by System 2 during peak and off-peak hours. For example, on Saturday or Sunday, a cross-reference prompt to directional services may be implemented when a Requester 4 asks for restaurant information. It should be noted that the functions of Override Module 66 can be used to modify or augment closing prompts found in Special Announcement fields and General Announcement fields. The complete breadth of examples of the functions of Override Module 66 are too numerous to fully illustrate, however, it should be noted than any ability to modify, add to, subtract from the closing prompt codes that are found in the Special Announcement field and the General Announcement field are within the contemplation of this invention.

Next, Closing Prompt Processor Module 64 looks to Call Completion Data Table 68 to determine a closing prompt based on the information fields contained therein.

As illustrated in FIG. 8, these fields include: the Number Dialed by Requester field 60A, Data Source of the Requested Listing field 60B, Types of Data field 60C, Service Requested field 60D, Preferred Language field 60E, the NPA/NXX of destination number field 60F and Other Listing Table 52A and/or Database 18 data field 60G. These fields are populated by data contained in Listing Table 52A and/or Database 18 and from information contained in Agent Application 19 on Operator Terminal 20.

The Number Dialed by Requester field 60A contains information that can be used by Closing Prompt Module 27 to identify the number dialed by Requester 4, the service provider of Requester 4, the originating Switch 12 and the call completion area for this call. This information is obtained from the data source field of Listing Table 52A and/or Database 18.

The Data Source of Requested Listing field 60B contains information that can be used by Closing Prompt Module 27 to identify the data source which provided the listing information. This information is obtained from the data source field of Listing Table 52A and/or Database 18.

The Type of Data field 60C informs Closing Prompt Module 27 of the what type of data was solicited by Requester 4, such as traditional directory assistance, movies, restaurants, directions, categories and/or other business searches. The information used to populate the Type of Data field 60C is obtained from various fields in Listing Table 52A and/or Database 18.

Service Requested field 60D contains information used by Closing Prompt Module 27 which can identify the type of service requested by Requester 4 such as; information requests, commerce requests, reservation requests, etc. The information used to populate the type of service requested field 60D is obtained by Agent Application 19 on Operator Terminal 20 from Listing Table 52A and/or Database 18.

Preferred Language field 60E contains information used by Closing Prompt Module 27 to indicate the preferred language of Requester 4. This information is used to ensure that the proper language closing prompts can be used. It is also contemplated by the current invention that the Preferred Language field 60E can be used in conjunction with the Special Announcement field and General Announcement fields of Listing Table 52A and/or Database 18. The data used to populate Preferred Language field 60E is obtained from either Operator Terminal 20 or from the Special Services field of Listing Table 52A. One possible implementation would be to populate the Preferred Language field 60E based on the number dialed by Requester 4; however, this is not the only possible implementation.

The NPA/NXX (Numbering Plan Area/Exchange code) of the Destination Number field 60F contains information used by Closing Prompt Module 27 to identify the location of the listing so as to select a location based closing prompt.

Lastly, the Other Listing Table 52A or Database 18 field 60G contains information used by Closing Prompt Module 27 to identify any additional information in Listing Table 52A and/or Database 18 that could be of use in selecting a closing prompt.

Fields 60A–60G for Closing Prompt Module 27 are intended only to provide examples of possible fields and are in no way intended to limit the scope of the invention. Any field which can be used in Closing Prompt Module 27 to tailor a closing prompt to allow for targeted third party advertising and other such uses is within the contemplation of the present invention.

At this point, regardless of the order in which the information was gathered, Closing Prompt Processing Module 64 of Closing Prompt Module 27 uses the Agent Application 19's logic to determine what information should be used to populate Closing Prompt field 58 of Call Completion Data Packet 50. One example of this logic is for Closing Prompt Module 27 first to look to the Special Announcement and the General Announcement fields of Listing Table 52A and/or Database 18. Next, Closing Prompt Processing Module 64 looks to Override Module 66 to see if there are any additions, modifications, or other instructions that are added to or subtracted from the closing prompts found in the Special Announcement and General Announcement fields. Next, Closing Prompt Processing Module 64 looks to Call Completion Data Table 68 to see if there are any additions, modifications, or other instructions that are added to or subtracted from the closing prompts decision made above. Finally, upon selecting the appropriate closing prompt, Closing Prompt Module 27 populates the Closing Prompt Code field 58 of Call Completion Data Packet 50.

Unlike prior art, this invention dynamically alters the closing prompt to tailor a specific message to the Requester 4 based on information obtained through the call. This decision can be based on specific Wireless Apparatus 6 instructions, third party instructions, other information contained in Listing Table 52A and/or Database 18, Override Module 66 and/or possible fields 60A–60G of Call Completion Data Table 68.

Agent Application 19 software then creates a Call Completion Data Packet 50. Alternatively, Closing Prompt Module 27 or some other application could create Call Completion Data Packet 50; however, for the purposes of this discussion Agent Application 19 will be forming Call Completion Data Packet 50. As illustrated in FIG. 9, Call Completion Data Packet 50 is comprised of multiple data fields. This can include but is not limited to the Originating Phone Number of Requester field 54, the Wireless Apparatus Identification Number (WAIN) Information Field 56, Closing Prompt Code Field 58 and Pre-announcement field 59. It should be noted that it is contemplated by the current invention that the WAIN information field may include both wireless and wireline listings.

Call Completion Data Packet 50 is formed by Agent Application 19 at Operator Terminal 20 using information from Incoming Call Information Record 15, Listing Table 52A from Database 18, and Closing Prompt Module 27. This information is then organized and used to populate the fields of Call Completion Data Packet 50.

The Originating Phone Number field 54 is the originating phone number of Requester 4. The Wireless Apparatus Identification Number (WAIN) Information field 56 is the requested listing of the subscriber. This information is provided to Operator Terminal 20 by the retrieved listing from Listing Table 52A and/or Database 18. The WAIN Information field identifies the proper destination for the completed call. This information is used to properly connect Requester 4 to Wireless Apparatus 6. Closing Prompt Code field 58 of Call Completion Data Packet 50 contains instructions on which closing prompt to retrieve, use and play for Requester 4. Pre-announcement field 59 of Call Completion Data Packet 50 denotes to the Voice Response Unit (VRU) whether or not the pre-announcement feature is activated. If the pre-announcement feature is activated the VRU will announce Requester 4's identity to Wireless Apparatus 6 by either voice or text message so that Wireless Apparatus 6 can determine whether or not to accept the call.

When combined, the Originating Phone Number of Requester field 54, the WAIN Information field 56, the Closing Prompt Code field 58, and the Pre-announcement field 59 contain all of the information needed to initiate and complete the call, play the appropriate closing and pre-announcement.

Wide Area Network (WAN) 25 is configured to couple all Operator Terminals 20 to System 2 and 2'. This includes connections between geographic locations, such that Operator Terminals 20 located at a call center can connect with Switches 12 at other remote locations. As noted earlier and to be discussed in more detail below, because Primary Call Center 16 may route calls to remote Operator Terminals 20' it is necessary that those Operator Terminals 20' be able to communicate back to the originating Switch 12 in order to connect to the proper call. WAN 25 is configured to relay Call Completion Data Packet 50 to the appropriate Switch 12 in order to complete Requester 4's call. A more complete description of the function of WAN 25 within System 2 is discussed below.

Agent Application 19, as supported by one of the Operator Terminals 20, communicates via Operator Terminals 20 to any one of the Switches 12 with the combination of Systems 2, 2' etc. via Wide Area Network 25 (WAN). WAN 25 allows customer service representatives at Operator Terminals 20 to transmit a Call Completion Data Packet 50 from Operator Terminals 20 to any one of Switches 12. In the event that Agent Application 19 is unable to successfully pass Call Completion Data Packet 50 due to any number of reasons including but not limited to the unavailability of WAN 25 or the rejection of Call Completion Data Packet 50, Agent Application 19 can initiate call completion using in-band signaling such a DTMF. This allows Agent Application 19 to put the caller on soft hold and pass the destination digits to Switch 12 via the same trunk. Switch 12 then accepts the digits and releases the call to Call Center 16 and initiates call completion as described hereinafter.

Regarding signaling and trunking configurations, the communication links between Switch 12 and Primary Call Center 16 (or call center 16') and the communication links between Switch 12 and Mobile Switching Center (MSC) 8 can be implemented as release link trunks. In this embodiment of the current invention the communication links are released once the call completion data is transmitted to the destination end of the link. Release link trunk technology is known in the art and allows resources at the destination device to be freed by employing a predetermined signaling sequence which is recognized by the destination device as a release link signal. In addition, in another embodiment of the current invention, the communication links between Switch 12 and Mobile Switching Center (MSC) 8 can be implemented as Multi-frequency MF signaling. One possible example of MF signaling is Feature Group-D (FG-D) links as commonly known in the industry.

In an alternative embodiment of the current invention, the communication links between Switch 12 and Mobile Switching Center (MSC) 8 can be implemented as SS7. SS7 is a type of out-of-band signaling, as is commonly known in the industry. In another embodiment of the invention, the links between Switch 12 and MSC 8 can be implemented as DTMF signaling. DTMF is a type of in-band signaling. All of these signaling choices are known in the art and are meant only as possible embodiments of the current invention but should not be seen as limiting the possible choice of communication links by which the current invention can be implemented.

As part of the call completion process, Switch 12 has the ability to select the optimal trunk group to be used for the completion of Requester 4 to Wireless Apparatus 6. For example, if Switch 12 has a direct connection to the Service Provider 26 of Wireless Apparatus 6, the completion of this call would be implemented over this link.

In the case where Switch 12 did not have a direct connection to the Service Provider 26 of Wireless Apparatus 6, the completion of this call would be via the PSTN 10. This allows Switch 12 to select the most cost effective means of delivering the call to Wireless Apparatus 6. This selection of the outbound trunk group may be determined by Call Completion Table 17 (as shown in FIGS. 1, 2 and 3) based on information contained in Call Completion Data Packet 50. For example, the NPA.nxx of the number in the WAIN Information field 56 in Call Completion Data Packet 50 can be used to indicate Service Provider 26 for that listing. This information is then used to determine whether a direct connection exists from Switch 12 to that Service Provider 26. If such a direct connection exists, then the first choice route for this call would be via that link. In the event that such direct connection is not available or does not exist, an alternate route such as a connection to the PSTN 10 could be used.

Requester Call Operations

Figure 10:
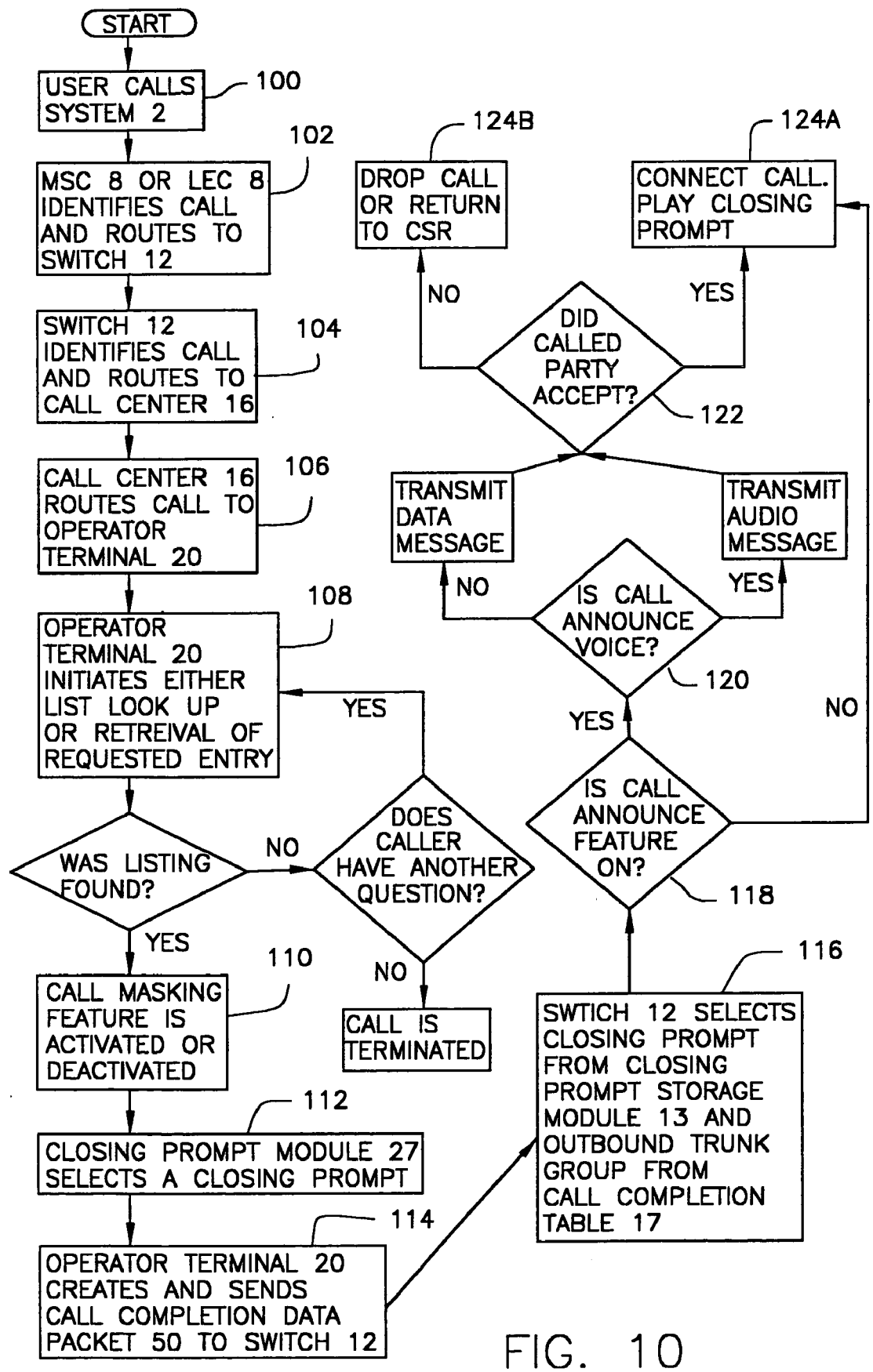
FIG. 10 is a flow chart demonstrating the operation of the system in accordance with one embodiment of the present invention.

As illustrated in the flow diagram of FIG. 10, initially, at step 100, Requester 4 calls System 2. The method for accessing System 2 can be via any known dialing pattern such as an "800" number, an NPA.nxx.xxxx number or NPA-555-xxxx, but also can be a shortened information-like number, such as "411," "555," "#555," etc. Preferably, access to System 2 is arranged such that the access number dialed by Requester 4 is available nationwide such that Requester 4 need not be concerned with individual access numbers depending on their location, or whether they are accessing System 2 via a wireless device or a wireline device.

At step 102, Mobile Switching Center (MSC) 8 recognizes the pattern dialed by Requester 4 as belonging to System 2 (i.e., a request for communication assistance) and routes the call to Switch 12 along with the originating phone number of Requester 4. Switch 12 tracks call detail information upon receiving the call from MSC 8.

Although not shown, the signaling methodology of the present invention can be implemented using the method and devices described in U.S. application Ser. No. 09/449,126, filed Nov. 24, 1999.

An additional feature of Switch 12 is its ability to recognize and translate dial number strings allowing System 2 to provide agent application services to multiple customers. Upon dialing the appropriate number, MSC 8, is configured to recognize that the dialed number string belongs to the communication assistance system and method, and routes the inbound call to Switch 12. If necessary, prior to routing the call to Switch 12, MSC 8 may translate the user's dial string (for example #555) to a digit sequence recognized by System 2.

Figure 16:
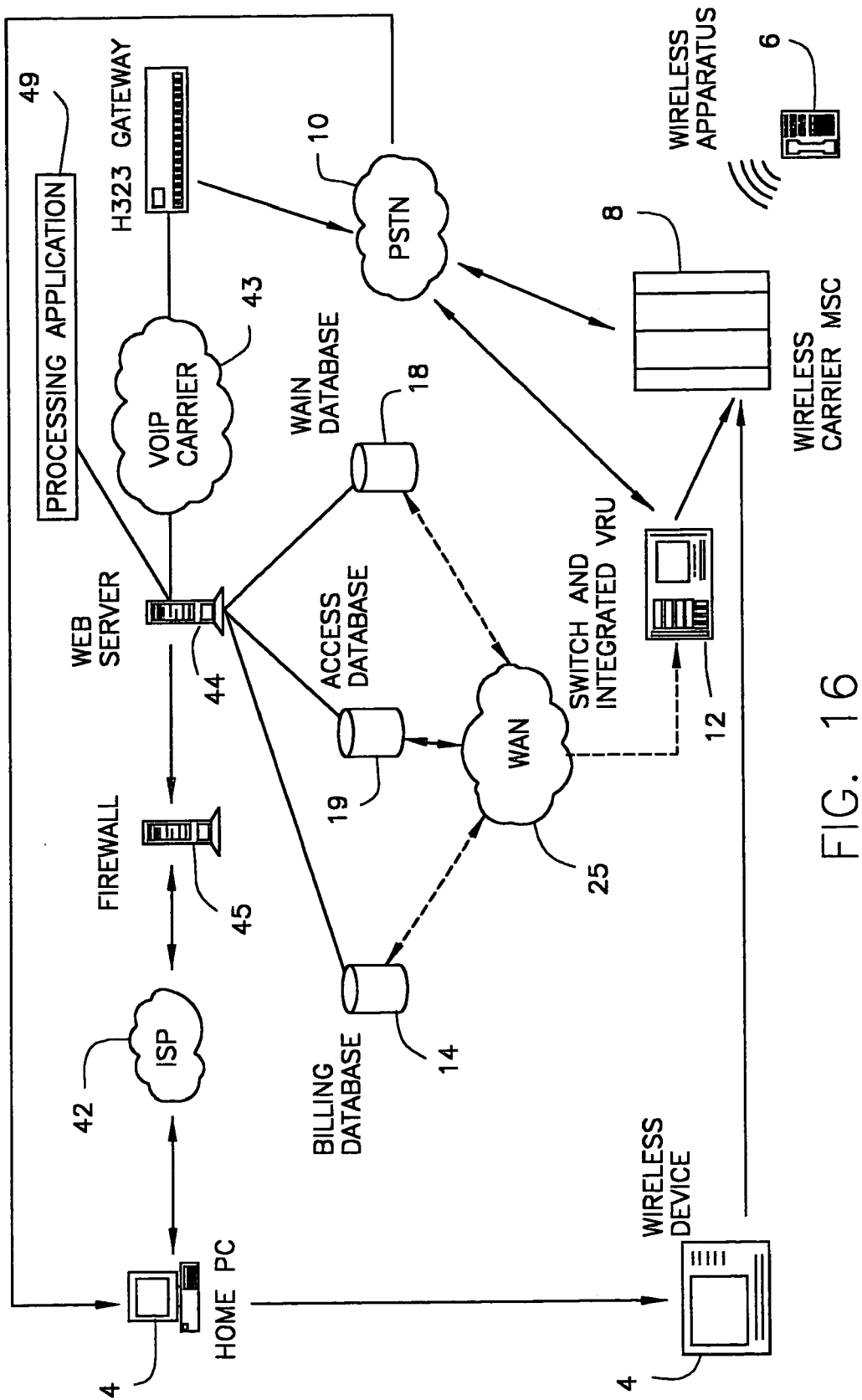
FIG. 16 is a diagram of an example of the components used to provide access to the WAIN database via Internet access, while still maintaining the confidentiality of the listings.

This translation allows different service carriers to access the service provided by the present invention using either a universal access number or different user dial strings. For example, in the event that two carriers decide to use different dial strings (i.e. cellular telephone carrier A may support access to System 2 by dial string *5 while cellular carrier B may access the service using the dial string 411), each carrier's Mobile Switching Center (MSC) 8 may or may not select to translate this dial string before routing the call to Switch 12. Upon receiving the inbound call, Switch 12 may further translate the MSC 8 dial string and route the call to Primary Call Center 16. The number sent by Switch 12 allows System 2 to identify the particular MSC 8 from which the dial string was received along with the actual MSC dial string so that elements of System 2 can determine what service is desired, and where the inbound call originated. It is also contemplated by this invention that calls may originate from a wireline carrier and/or VoIP carrier as shown in FIG. 1 and FIG. 16, respectively.

For example, Switch 12 might translate Mobiles Switching Center (MSC) 8 dial string 411 to any four-digit number (this string length is for example only and can be modified) such as 9605. This four-digit string is used to populate the Number Dialed by Requester field 60A in Call Completion Data Table 68 as shown in FIG. 8. The translated digit string will be referred to as the Direct Inbound Dial (DID) number. Each Switch 12 can have multiple DID numbers to identify Requester 4's request for different services and their calling location.

An additional feature available using this technology is to provide a separate dial string as an indicator of preferred language information to System 2. For example, if a dial string such as NPA.555.1818_is used, Switch 12, after translating the MSC dial string, will automatically send a Spanish language preference indicator in Incoming Call Information Record 15 so that the Primary Call Center 16 will route the call to an appropriate Operator Terminal 20, such as a Spanish speaking operator. Advantageously, Spanish speaking operators may be located remotely from System 2 and calls to be handled by them may be routed via Call Center 16 to a remote Call Center 16' as described above in reference with FIGS. 1–3.

It should be noted that the above example of call signaling methodology is intended only as an example of call routing and Requester 4 identification and is not intended to limit the scope of the present invention. Any such signaling methodology protocol which is capable of transmitting the call between the MSC 8 and Switch 12 is within the contemplation of the present invention.

At step 104, Switch 12 routes the call to Primary Call Center 16. To perform this task, Switch 12 creates Incoming Call Information Record 15, as shown in FIG. 4, with the pertinent information as described in more detail above, and selects a direct trunk to Call Center 16. The configuration being used to carry the call between Switch 12 and Primary Call Center 16 preferably is a release link trunk configuration, discussed above in detail. While not discussed here, it is contemplated that any trunking and/or signaling configuration can be used to route the call from Switch 12 to Call Center 16. It is also contemplated by this invention that Switch 12 may connect this call to Call Center 16 via Public Switched Telephone Network PSTN 10 (i.e. using an 800 number or a directly dialed number).

Next, at step 106, upon receiving the call from Requester 4, Primary Call Center 16 notifies an available Operator Terminal 20 with the appropriate skills, if necessary, that an inbound request has arrived and routes the call there. Upon establishing a link between Requester 4 and Operator Terminal 20, Primary Call Center 16 establishes a voice and communications link from the caller to the customer service representative. The two-way voice communication is routed directly from Requester 4 through Primary Call Center 16 to Operator Terminal 20, having an attached telephonic communication means. The data communication, which may include any information contained in Incoming Call Information Record 15 (i.e. the number dialed by Requester 4 (the DID), the preferred language code, the originating phone number of the requester and the requester service provider field) is transmitted to the Primary Call Center 16 to Operator Terminal 20 via Computer Telephony Interface (CTI) 29. CTI 29, deployed between Primary Call Center 16 and Operator Terminals 20, is used to communicate the information necessary for the customer service representative and Agent Application 19 software to handle and complete the call.

Using this link, an agent asks Requester 4 for information regarding the services they are requesting. Requester 4 supplies the necessary information. An example of this information may include but is not limited to: the directory listed name, the defined locality, the email address, the name, wireline phone number, license plate, etc. It is contemplated by the current invention that traditional directory assistance and enhanced directory assistance may also be provided by this system. At step 108, the agent at Operator Terminal 20 then initiates a search of Database 18. Of course, if Primary Call Center 16 is busy or there are no available Operator Terminals 20, the Requester 4's call can be forwarded to Call Center 16' which can accommodate the requester's inquiry in the same manner as described above in step 106. If the requested listing is unavailable, the agent awaits further instruction from Requester 4.

Next, at step 110, the listing for Wireless Apparatus 6 is reviewed to determine if the number requested is unlisted or if it is masked to prevent Requester 4 from receiving the actual number. The records associated with Wireless Apparatus 6 in databases such as 18 and 18', as listed in Listing Table 52A, are provided with a Wireless Apparatus Identification Number (WAIN) Connect field, having a WAIN Field Sub Table 70 which indicates to Operator Terminal 20 whether or not a customer service representative is permitted to connect the call and, if so, disclose the WAIN to Requester 4. This ensures unlisted numbers remain unreachable and that the WAIN of Wireless Apparatus 6 remains confidential if the corresponding subscriber so wishes.

During operation, Agent Application 19 software reviews WAIN Field Sub Table 70 to check if the number is unlisted. If so, the customer service representative informs Requester 4 of this and awaits further instructions. If the number is listed, then Agent Application 19 checks to see if the number is masked. This is the feature that is "on" or "off" at the request of the subscriber of Wireless Apparatus 6; however preferentially, the default is set to masked. If the number is masked, the call is connected without Requester 4 ever seeing or hearing the number. If the number is not masked, Requester 4 receives the number and is offered the service of automatic dial or other such comparable service. Of course, it is understood that the above described operation and method are easily implemented in the software arrangement in FIG. 6 or any other software arrangements known to those familiar with the art. It is also contemplated by this invention that Database 18 may be stored in an encrypted format to protect it from intrusion, hacking or other forms of unauthorized access or use.

Alternatively, for an even more secure listing for Wireless Apparatus 6, the WAIN of Wireless Apparatus 6 is not displayed to the customer service representative at Operator Terminal 20. Although System 2 will have the information it will not be displayed to the customer service representative. In this case, Operator Terminal 20 and Switch 12, communicating through Call Completion Data Packet 50 and Wide Area Network (WAN) 25, complete the call while maintaining the secrecy of the WAIN throughout.

Next, at step 112, Closing Prompt Module 27 decides on an appropriate closing prompt, based on the criteria described above. The closing prompt is either read from Special or General Announcement field of Listing Table 52A, selected or modified by Override Module 66 or selected by logic contained in Closing Prompt Processor Module 64 based on Wireless Apparatus 6 and Requester 4 information found in Call Completion Data Table 68. A code or multiple codes for the prompt or prompts is then used by Closing Prompt Module 27 to populate Closing Prompt Code Field 58 of Call Completion Data Packet 50 so as to determine which recorded closing prompt is to be played.

Next at step 114, Agent Application 19 software on Operator Terminal 20 constructs Call Completion Data Packet 50. Call Completion Data Packet 50 is prepared using information from Incoming Call Information Record 15, Listing Table 52A, Database 18, Closing Prompt Module 27, Agent Application 19 and verbal information from Requester 4.

Upon completion of Call Completion Data Packet 50, Operator Terminal 20 transmits Call Completion Data Packet 50 to Switch 12 via Wide Area Network 25. WAN 25 is connected to all Switches 12 and all Operator Terminals 20 in System 2, such that should an Operator Terminal 20 be remotely located from Switch 12 as a result of call routing, Operator Terminal 20 will be able to send the Call Completion Data Packet 50 through WAN 25, even to remotely located Switches 12. The appropriate Switch 12 is identified by Agent Application 19, using the DID which identifies the originating switch where the Requester 4's call entered System 2.

Next, at step 116, Switch 12 initiates the call between Requester 4 and Wireless Apparatus 6. Switch 12 then begins tracking call detail information and other functions for the call completion leg. Switch 12 then uses the information in Call Completion Data Packet 50 to select the appropriate closing prompt from Closing Prompt Storage Module 13, and the appropriate outbound trunk group from Call Completion Table 17.

At step 118, System 2 checks Pre-announcement field 59 of Call Completion Data Packet 50 which indicates whether or not the subscriber of Wireless Apparatus 6 wishes a calling party to be "pre-announced" to them. If the subscriber of Wireless Apparatus 6 chooses that the calling party be pre-announced, then this pre-announcement provides an opportunity to accept or reject the inbound call. The pre-announcement feature is available to Wireless Apparatuses 6 on inbound calls from both wireless and wireline Requesters 4. Inbound calls from wireless Requesters 4 are defaulted to pre-announce "on" and inbound calls from wireline Requesters 4 are defaulted to pre-announce "off"; however, any subscriber and/or System 2 provider can decide to change this setting at any time. If the pre-announcement feature is "off" System 2 proceeds to step 124A, if pre-announcement feature is "on" then system proceeds to step 120.

Next, at step 120, System 2 consults the Pre-announcement field 59 of Call Completion Data Packet 50, to determine the method of transmitting the pre-announcement. The pre-announcement can be either in text or voice format. Using the fields in Call Completion Data Packet 50, System 2 determines what format is available based on the carrier and the device capabilities of Wireless Apparatus 6. If in voice format, Switch 12 and/or an integrated Voice Response Unit (VRU) will prompt Requester 4 to state his/her name. After recording Requester 4, Switch 12 and/or the VRU replays the voice to the subscriber of Wireless Apparatus 6. It is contemplated by this invention that this same voice message of Requester 4's name can be converted to a text message and be delivered to the subscriber as described below using text pre-announcements. If the pre-announcement is in text format Switch 12 transmits the originating number of Requester 4 to Wireless Apparatus 6, or alternatively sends more complete information on Requester 4 provided it is available to System 2. Text messaging can be sent in WAP (Wireless Application Protocol) or any other protocol which is sufficient to transmit the necessary information and is supported by the Service Provider 26 of Wireless Apparatus 6.

At step 122, if the Wireless Apparatus 6 indicates acceptance of the inbound call, then see step 124A below. If the call is not accepted, see step 124B.

At step 124A, in the case where the Wireless Apparatus 6 wishes to accept the inbound communication request, Wireless Apparatus 6 indicates acceptance via an appropriate command to System 2.

Additionally upon completion of the call, Switch 12 uses the information in Closing Prompt Code field 59 of Call Completion Data Packet 50 to play the appropriate closing prompt to Requester 4 just before they are connected to Wireless Apparatus 6.

At step 124B, if Wireless Apparatus 6 wishes to refuse the call they can use any number of methods to terminate the call on their end as described above. In this case, a closing message is read to Requester 4 explaining to them that Wireless Apparatus 6 did not accept the call, and/or was unavailable and subsequently, they are dropped by System 2. In one possible embodiment of this invention, this closing message may be zero seconds in length. Alternatively, if the call cannot be completed to Wireless Apparatus 6, System 2 can transfer Requester 4 back to a customer service representative for further assistance.

In another embodiment of the present invention, if the call cannot be completed to Wireless Apparatus 6, Wireless Apparatus 6 may choose to send Requester 4 to a Voice Mail system with the option to leave a message.

Figure 15:
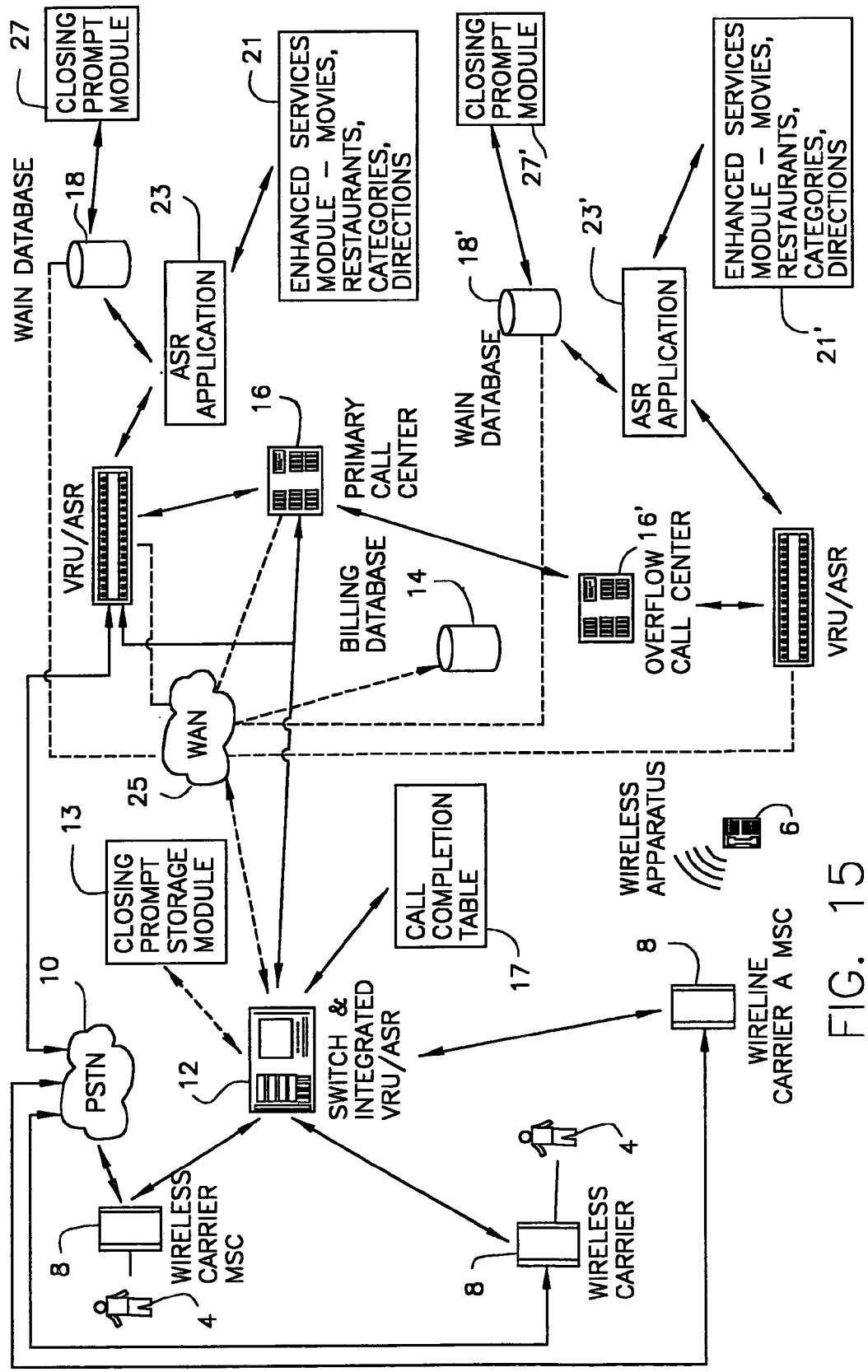
FIG. 15 is a diagram of an example of the components used to provide access to the WAIN database via a voice recognition portal, while still maintaining the confidentiality of the listings.

Another embodiment of the invention is shown in FIG. 15. FIG. 15 is a diagram of an example of the components used to provide access to the Wireless Apparatus Identification Number (WAIN) database via a voice recognition portal, while still maintaining the confidentiality of the listings. Requester 4 communicates to the Switch 12 by either directly dialing a special number or by calling Requester 4's landline carrier and being routed to Switch 12. Requester 4 can also access the data by communicating through Wireless Carrier A to Switch 12. In one embodiment of the invention, Switch 12 and an integrated VRU (Voice Response Unit)/ASR (Advanced Speech Recognition), Mobile Switching Center (MSC) 8 and PSTN 10 and the Primary Call Center 16 are connected via WAN 25. In another embodiment, Switch 12 and the VRU/ASR are separate units connected via WAN 25.

When Requester 4 is connected to the VRU Voice Response Unit)/ASR (Advanced Speech Recognition), Requester 4 is guided through a series of voice prompts running on ASR Application 23 that will lead to the selection of the phone number associated with the subscriber of Wireless Apparatus 6. While any of the fields in listing Table 52A may be read by the VRU/ASR to Requester 4, it is expected that in most cases only the name and address information may be read by the VRU/ASR to Requester 4. Once Requester 4 has selected the desired listing, the system will select the appropriate closing using the selection criteria explained previously. Finally, all of the pre-announcement and call completion logic described previously apply to the completion of this call via Switch 12 or PSTN 10.

Another embodiment of the invention is shown in FIG. 16. FIG. 16 is a diagram of an example of the components used to provide access to the Wireless Apparatus Identification Number (WAIN) database via an Internet portal, while still maintaining the confidentiality of the listings. In this embodiment of the invention, Requester 4 accesses the WAIN database via a personal computer, Home PC 4B, connected to the Internet through an ISP (Internet Service Provider) or other appropriate connection. Requester 4 accesses an application that resides on Web Server 44 after passing through the Internet Firewall 45. The application then requests specific pieces of information, which will be provided by Requester 4. That information is in turn employed by the application to access data on the WAIN database and provide a list of names and addresses that may fit the criteria entered by Requester 4. If Requester 4 selects one of the listings offered, Requester 4 will be connected to Wireless Apparatus 6 via a Voice over IP Carrier 43 to an H323 Gateway connected to PSTN 10 and Mobile Switching Center (MSC) 8.

In another embodiment of this invention, the call may also be completed via access through a Voice over IP Carrier 43 via an H323 Gateway connected via Switch 12 directly to MSC 8.

In another embodiment of this invention, once a desired listing is identified, Processing Application 49 writes the originating phone number for Device 4 (Device 4 may be either wireless or wireline), the listing for Wireless Apparatus 6 and an assigned access number to Access Database 19. The assigned access number is then sent to Home PC 4. The user of Home PC 4 may then manually dial the assigned access number on Device 4. It is also contemplated by this invention that the assigned access number may be sent to Device 4, in the event that Device 4 is wireless, via a data protocol including, but not limited to: WAP, SMS, iMode interface, etc. The subscriber of Device 4 dials the assigned access number, which connects Device 4 to Switch 12.

Based on the access number and originating phone number of Device 4, Switch 12 searches Access Database 19 and retrieves the listing for Wireless Apparatus 6. Switch 12 then performs call completion by either a direct connection to Mobile Switching Center (MSC) 8 or via PSTN 10. In all cases the processing of the closing prompts, pre-announcements, call completion and billing will be handled as previously outlined herein.

Figure 17:
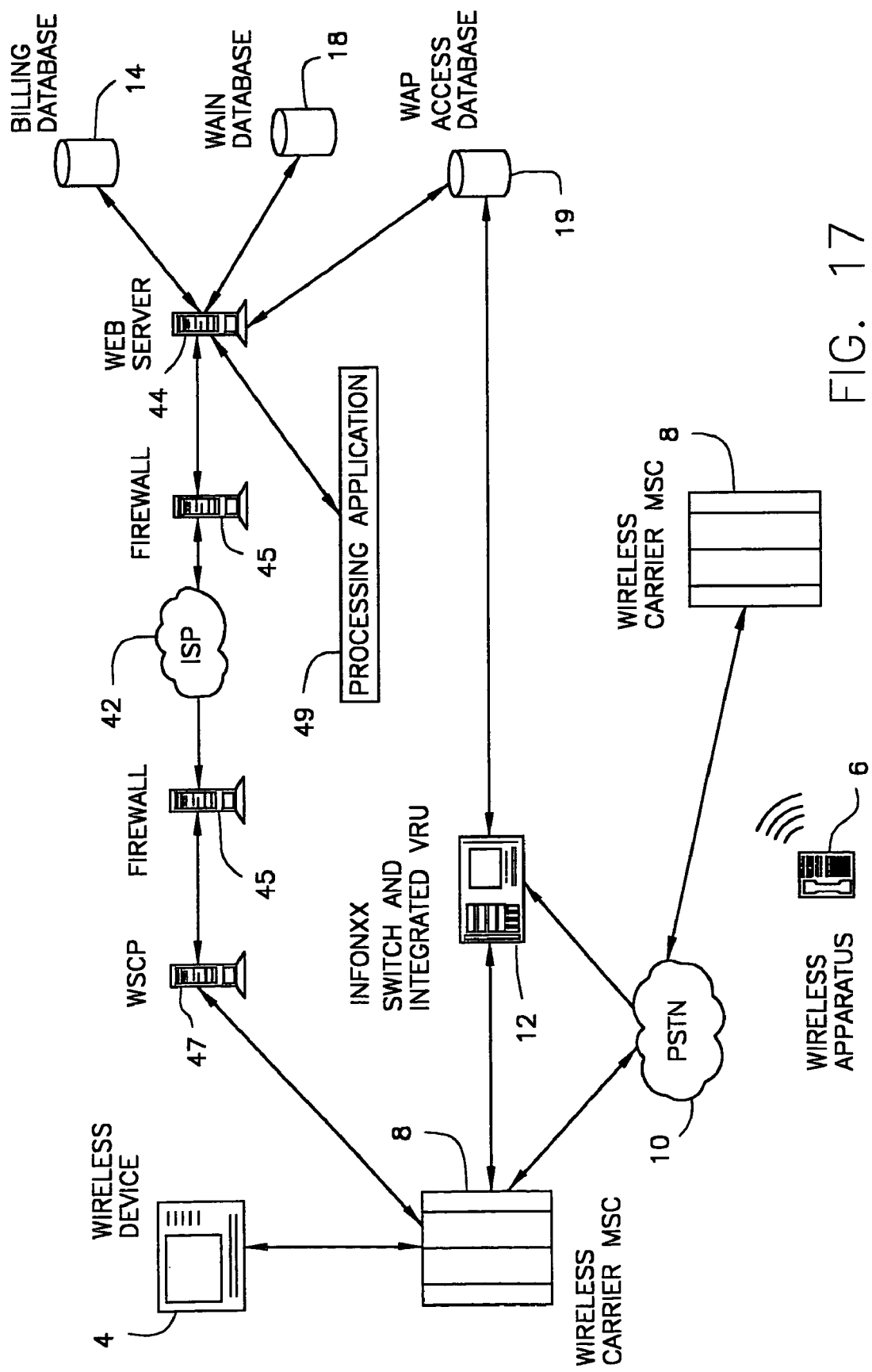
FIG. 17 is a diagram of an example of the components used to provide access to the WAIN database via a WAP (wireless application protocol) portal, while still maintaining the confidentiality of the listings.

Another embodiment of the invention is shown in FIG. 17. FIG. 17 is a diagram of an example of the components used to provide access to the Wireless Apparatus Identification Number (WAIN) database via a data protocol included but not limited to: WAP (Wireless Application Protocol), SMS, iMode interface, while still maintaining the confidentiality of the listings. In this embodiment of the invention, Requester 4 performs a query via the Wireless Device 4. At Mobile Switching Center (MSC) 8, the request is processed by WSCP (Wireless Services Control Point) 47 and interfaced through the carrier's Firewall 45 to the Internet via ISP 42. The request is in turn processed through System 2's Firewall 45 and passed to Web Server 44. On Web Server 44, Processing Application 49 takes the information sent and structures a query that will go against the WAIN Listing Database 18. The WAIN Database 18 returns a number of listing names and addresses that are consistent with the request. This information is sent back via Firewall 45 to Wireless Device 4. The transmitted information is displayed on the Wireless Device 4, and the subscriber of Wireless Device 4 is then able to either select a specific listing or request additional listings. If additional listings are requested, the cycle is repeated until the subscriber either finds the desired listing or stops the search.

Once a desired listing is identified, Processing Application 49 writes the originating phone number for Wireless Device 4, the listing for Wireless Apparatus 6 and an assigned access number to Access Database 19. The assigned access number is then sent to Wireless Device 4. The subscriber of Wireless Device 4 dials the assigned access number, which connects wireless device 4 to Switch 12. Based on the access number and originating phone number of Wireless Device 4, Switch 12 searches Access Database 19 and retrieves the listing for Wireless Apparatus 6. Switch 12 then performs call completion by either a direct connection to Mobile Switching Center (MSC) 8 or via PSTN 10. In all cases, the processing of the closing prompts, pre-announcements, call completion and billing will be handled as previously outlined in this document.

Billing Procedure

The billing procedure of the present invention is explained as follows. When Requester 4 contacts Call Center 16 or 16' and is connected to a Wireless Apparatus 6, billing records are preferably created in at least three places: 1) on the system of the originating Service Provider 26, 2)

System 2 (which may include Switch 12, Call Center 16 and Database 18), and 3) the system of the terminating Service Provider 26.

As taught by the prior art, if nothing were done, these billing records would result in the following charges:
1) The originating Service Provider 26 would bill the calling party for the call to System 2 and a per minute charge for the duration of the call to the primary call center as well as the duration of the call completion if applicable.
2) Depending on the Wireless Apparatus Identification Number (WAIN) of Wireless Apparatus 6 and service rate plan of Requester 4, the originating Service Provider 26 might also bill Requester 4 for toll charges if the communication with Wireless Apparatus 6 is a toll call; and
3) The terminating Service Provider 26 would bill the subscriber of Wireless Apparatus 6 for airtime.
4) In addition, in the event that the subscriber of Wireless Apparatus 6 is roaming, the terminating service provider may or may not be the service provider for Wireless Apparatus 6. In the case in which roaming charges would be incurred the terminating Service Provider 26 would bill the Service Provider 26 of Wireless Apparatus 6 for these charges. Service Provider 26 of Wireless Apparatus 6 would then bill the subscriber of Wireless Apparatus 6 for these charges and any additional charges Service Provider 26 may choose to impose.

In one aspect of the present invention, the subscriber of Wireless Apparatus 6, i.e. the called party, may not be charged for the communication session (call) with Requester 4. This decision on whether or not the called party should be billed for the incoming call, as discussed earlier, may be made by the subscriber of Wireless Apparatus 6 or Service Provider 26. This creates an issue in that the Service Provider 26 of the subscriber of Wireless Apparatus 6 still needs to be compensated. It is contemplated by the current invention that the Service Provider 26 of the subscriber for Wireless Apparatus 6 will be compensated by Requester 4. This compensation may be collected in any number of ways; however, for simplicity, it is assumed herein that this compensation will be collected by Service Provider 26 of Requester 4.

In the event that the subscriber for Wireless Apparatus 6 is not roaming, the functionality of System 2 includes acting as a billing clearinghouse in the following fashion. The Service Provider 26 of the subscriber of Wireless Apparatus 6 agrees not to charge the called party (i.e. the subscriber of Wireless Apparatus 6) for inbound calls from System 2. This is preferably accomplished by either rating communication sessions which originate from System 2 at $0.00 or by stripping the corresponding records from the database of terminating Service Provider 26 (in this example, the terminating Service Provider 26 is also the wireless carrier for the subscriber of Wireless Apparatus 6).

System 2 will generate a record of this inbound call to System 2 and, if necessary, the corresponding completion or completion attempt to the subscriber of Wireless Apparatus 6. This billing record is created in Billing Database 14 or another database (not shown). As discussed above, these billing records preferably include but are not limited to the call date, the call start time, the call end time and the resulting time, i.e. the call length, the originating phone number for Requester 4, the Wireless Apparatus Identification Number (WAIN) for Wireless Apparatus 6 and fields which identify the originating service provider and the service provider of Wireless Apparatus 6. This record is preferably created from the records in Switch 12, but is not limited to such and may contain information on call origination and/or call completion legs and any other necessary information. In addition, any data that is received from Service Provider 26 of Wireless Apparatus 6 related to roaming and/or other charges may also be included.

These records are then generated and transferred to the originating Service Provider 26 for inclusion in the bill to Requester 4. This is accomplished by formatting the billing record data into an appropriate format for each service provider's billing system and transmitting the records to the service providers on a periodic or requested basis. The service providers can then rate these billing records at agreed upon rates and can include them on the bill to Requester 4 along with a per call charge and any airtime, roaming and/or toll charges.

Funds, or a portion thereof, collected by the originating Service Providers 26 of Requester 4 for these charges are preferably passed to the provider of System 2. The provider of System 2 and/or a third party using information from System 2, then distributes these funds back to the service provider for the subscriber of Wireless Apparatus 6, the originating Service Provider 26, the provider of System 2 and the third party, if necessary, in accordance with an agreed distribution arrangement.

In the event that the subscriber for Wireless Apparatus 6 is roaming, the functionality of System 2 includes acting as a billing as described for the different cases below.

In the first case, the subscriber of Wireless Apparatus 6 is roaming and has chosen a rate plan under which he/she is not charged extra for roaming. In this case, the functionality of the current invention is as described above.

In the second case, the subscriber of Wireless Apparatus 6 is roaming and has chosen a rate plan under which he/she is charged extra for roaming; however, Service Provider 26 for the subscriber of Wireless Apparatus 6 has decided not to recoup these roaming charges. In this case, the functionality of the current invention is as described above.

In the third case, the subscriber of Wireless Apparatus 6 is roaming and has chosen a rate plan under which he/she is charged extra for roaming and Service Provider 26 for the subscriber of Wireless Apparatus 6 is interested in recovering these roaming charges. In this case, the functionality of the current invention is as described above with the following additional responsibilities for the provider of System 2 and Service Provider 26 of the subscriber of Wireless Apparatus 6. Service Provider 26 of the subscriber of Wireless Apparatus 6 agrees not to charge the called party (i.e. the subscriber of Wireless Apparatus 6) for inbound calls from System 2. This is preferably accomplished by either rating communication sessions which originate from System 2 at $0.00 or by stripping the corresponding records from the database of terminating Service Provider 26 or Service Provider 26 of the subscriber for Wireless Apparatus 6. In this case, Service Provider 26 of the subscriber for Wireless Apparatus 6 will also provide billing records of all calls that were completed to subscribers of Wireless Apparatus 6 where the subscriber of Wireless Apparatus 6 was roaming. These records would be provided to the vendor of System 2 and include, but not be limited to, the following information: the originating phone number of Requester 4, the Wireless Apparatus Identification Number (WAIN) of Wireless Apparatus 6, the date of the call, the start time of the call, the end time of the call, and any associated roaming charges for the call. System 2 will then include this information in the records which are generated and transferred to the originating Service Provider 26 for inclusion in the bill to Requester 4.

If roaming charges were incurred, the Service Provider 26 of Wireless Apparatus 6 will need to reimburse the terminating Service Provider 26 in accordance with their existing roaming agreement. Because there are funds flowing in both directions, the only funds that need to change hands in any given month are the net differences between what the service providers owe each other and what is owed to the provider of System 2 and/or the third party.

It is contemplated by the current invention that in certain cases the subscriber of Wireless Apparatus 6 may elect traditional wireless billing (i.e. incur the cost associated with of incoming call) rather than the calling party pays solution proposed herein.

Data Base Management and Updating

The devices and methods used to populate and maintain Wireless Apparatus Identification Number (WAIN) listings databases such as 18 and 18' are now described. For the sake of simplicity, the processes for creating and maintaining the databases will be described only with reference to WAIN Listings Database 18. WAIN Listings Database 18' is updated in the same manner, preferably by synchronizing WAIN Listings Database 18 with WAIN Listings Database 18'. Of course, additional call centers 16' can be implemented within System 2 such that additional instances of Database 18' can be provided.

Figure 11:
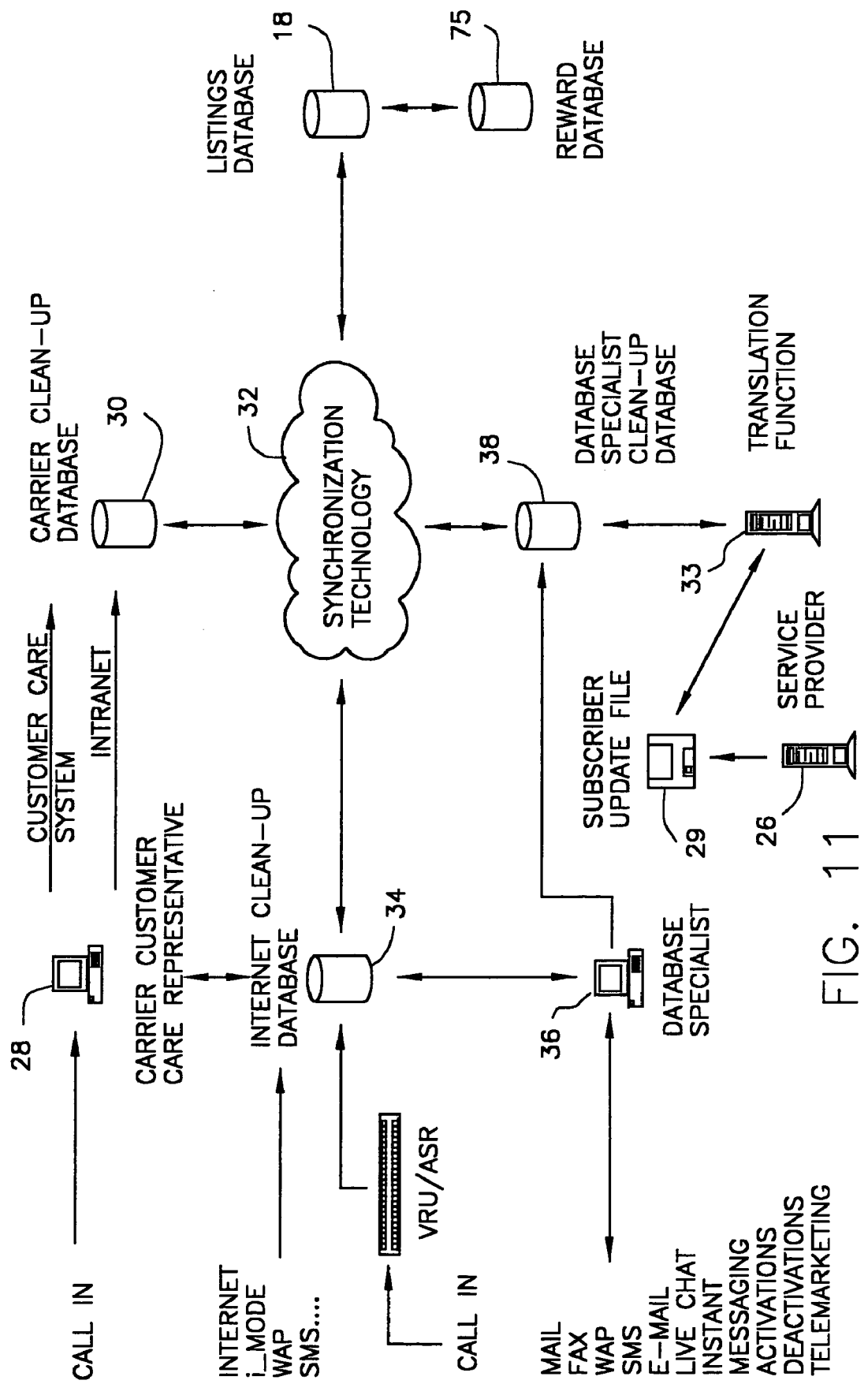
FIG. 11 is a diagram of a first embodiment of an arrangement used to create and maintain a WAIN listings database in accordance with one embodiment of the present invention.

FIG. 11 is a diagram of a first embodiment in which Wireless Apparatus Identification Number (WAIN) Listings Database 18 can be created and maintained. There are two primary methods for updating listings in Database 18 and the two methods are with operator support and without operator support. The methods for updating Database 18 with operator assistance include but are not limited to the following: direct subscriber call (i.e. voice), Instant Messaging, SMS, Live Chat, and/or WAP, etc. The methods for updating Database 18 without operator assistance include but are not limited to the following: direct subscriber call-in to a VRU/ASR (i.e. voice recognition), Internet (global communication) access, iMode, WAP, facsimile, electronic mail, etc. Further, the present invention provides access for notification from Service Providers 26 that new and existing subscriber accounts have been activated or deactivated or changed. In this example, the service providers and/or billing vendors for those service providers will prepare a data feed for the provider of System 2. It is also contemplated that data for Database 18 can be gathered via direct mail campaigns, telemarketing activities in which individuals are contacted by customer service representative and/or outbound text or data messages through which subscribers are asked to provide information regarding their wireless communication device subscriptions.

As discussed above, a subscriber may be prompted to call the service provider to update, create and/or delete his/her WAIN listing in Database 18. Prompting may occur via media advertisements (such as television, radio, newspaper, Internet portals, etc.), e-mail, direct mail, SMS messages, etc., or inserts and/or notifications accompanying the subscriber's bill. As shown in FIG. 11, a subscriber's call can be answered and handled by a carrier customer care representative using Carrier Customer Care Representative terminal 28. In this case, the carrier is preferably the Service Provider 26 corresponding to the subscriber's Wireless Apparatus 6. It is also contemplated by this invention that the subscriber may call the provider of System 2 so that the operator associated with Database Specialist terminal 36 can enter the subscriber's information. It is also contemplated by this invention that a subscriber may call a VRU (Voice Response Unit)/ASR (Advanced Speech Recognition) to update, create and/or delete his/her Wireless Apparatus Identification Number (WAIN) listing in Database 18. As shown in FIG. 11, a subscriber's call may be answered and handled via a VRU/ASR, inserting the information into the Internet Clean-up Database 34. The process by which the VRU/ASR gathers the information is similar to the processes discussed earlier (see discussion of FIG. 15).

As shown in FIG. 11, Carrier Customer Care Representative terminal 28 does not directly update WAIN Listings Database 18. Rather, Carrier Customer Care Representative terminal 28 updates Carrier Clean-up Database 30. Access to Carrier Clean-up Database 30 from Carrier Customer Care Representative terminal 28 is preferably via the carrier's own customer care system or Internet. Carrier Clean-up Database 30 is synchronized with WAIN Listings Database 18 by Synchronization Technology 32. Synchronization Technology 32 is preferably comprised of one or more computing devices that read the contents of Carrier Clean-up Database 30 and update WAIN Listings Database 18. Synchronization Technology 32 may be as simple as synchronization software built into the operating software, to as complex as custom designed software that functions via the Internet. It is also contemplated by this invention that the Synchronization Technology 32 may be used to update the carrier's database as well as Database 18.

Database 18 can also be updated or record creation and/or record deletion initiated via Internet access. Internet access is preferably supported by a web server coupled to the Internet from which a subscriber can access the web server to create, view and update his/her Wireless Apparatus Identification Number (WAIN) record. Methods and apparatus arrangement for accessing the Internet server and Internet Clean-up Database 34 are described in detail in U.S. application Ser. No. 09/449,126, filed Nov. 24, 1999. Regardless of the particular method of access and the particular device used by the subscriber to access the web site, Internet Clean-up Database 34 stores the created, deleted or updated WAIN listing such that Database 34 is synchronized with WAIN Listings Database 18 via Synchronization Technology 32 in the same manner as done with Carrier Clean-up Database 30.

WAIN Listings Database 18 can also be updated based on data received by mail, facsimile, electronic mail, SMS, Voice recognition, live chat, WAP, Instant messaging and/or iMode messaging, etc. received from the subscriber. In those cases, a database specialist using Database Specialist terminal 36 inputs the subscriber data into Database Specialist Clean-up Database 38. Database Specialist Clean-up Database 38 is synchronized with WAIN Listings Database 18 via Synchronization Technology 32 in the same manner as discussed above with respect to Carrier Clean-up Database 30 and Internet Clean-up Database 34. Database Specialist terminal 36 is preferably arranged to provide a graphical user interface input method implemented using known software or known software coding techniques, or via an Internet web browser such as NETSCAPE Communicator or MICROSOFT Internet Explorer.

It is also contemplated that subscriber data can be received directly from Service Providers 26 as they activate, deactivate and change subscriber's wireless apparatus accounts. Update File 29 containing the activation, deactivation and modification data can be sent or transmitted by any media (such as a DAT tape) or protocol (such as FTP (File Transfer Protocol) or NDM (Network Data Mover)) and then processed by Translation Function 33 directly into Database Specialist Clean-up Database 38. In other words, Database Specialist Clean-up Database 38 can be directly updated by Update File 29 when Service Provider 26 provides the data in the same format which is created by Database Specialist Terminal 36 during the update process with Database Specialist Clean-up Database 38.

In the case where Update File 29 is received in a format that cannot be used to directly update Database Specialist Clean-up Database 38, Update File 29 is processed by a Translation Function 33 executing on Database Specialist Terminal 36 to scrub the data and place it in a format compatible with Database Specialist Clean-up Database 38. Of course, the translation function need not execute on Database Specialist Terminal 36 and can instead be implemented using any processor arrangement capable of translating data from one format to another. One example of a data exchange format is XML.

In the case where activation, deactivation or modification data is provided by Service Provider 26 in Service Provider 26's customer care database, then it is contemplated that Carrier Clean-up Database 30 could either retrieve and/or receive specific new, deleted and/or modified listings for inclusion in Database 18.

It is contemplated that activation, deactivation and modification data received from Service Providers 26 may be missing certain fields required for an accurate record within the Wireless Apparatus Identification Number (WAIN) listing database. For example, data received from Service Provider 26 may not include the actual subscriber name. In this event, it would not be possible to look up a listing based on the subscriber name. In these cases, telemarketing, mailings, advertisements, sweepstakes, direct data messages to the subscriber of Wireless Apparatus 6, etc. are used to contact the subscribers in an effort to complete or correct the data or to alert subscribers to contact the provider of System 2 (or their local service provider) to update their records. In addition, it is contemplated that as Requester 4s, who are subscribers of Wireless Apparatus 6 with listings that have missing information or no information, call into System 2 they may be prompted by a VRU (Voice Response Unit)/ASR(Advanced Speech Recognition) to provide and/or update their listings.

It is also contemplated that a carrier customer care representative can use Carrier Customer Care Representative terminal 28 or that a database specialist can use Database Specialist terminal 36 to update Internet Clean-up Database 34 instead of, or in addition to, Carrier Clean-up Database 30 and Database Specialist Clean-up Database 38, respectively.

To increase the number of subscribers that clean up their own entries, promotions and other incentives can be awarded to those who take responsibility for updating their own entries. These promotions can be directed at individuals, group subscribers (such as corporations) or service providers. Promotions targeted at individuals and groups can include but are not limited to: sweepstakes, free air time, free service bundles and free use of custom closing prompts if they update his/her own listing. Similar types of incentives can be directed at a group of subscribers such as large corporations that maintain a large number of wireless devices. Incentives directed towards service providers can include, but are not limited to account wide discounts on the cost of System 2 if the service provider provides regular database updates.

In the area of smaller incentive and promotions for individuals or corporations, free use of new services can be offered to solicit database updates. These promotions can come in the form of advertisements, closing prompt offers or other similar methods. Additionally, periodically when Database 18 recognizes that a particular entry for a subscriber is missing information or has not been updated in a long time, for example one year, System 2 can be prompted to directly call and/or send a text/data message (i.e. WAP, SMS, iMode, etc.) to Wireless Apparatus 6 asking the subscriber to update his/her records. This call can not only be prompted by a specified time period but it can also be prompted when errors with call completion, other services and/or listings information are detected.

In addition to Wireless Apparatus Identification Number (WAIN) listing Database 18, Carrier Cleanup Database 30, Internet Clean up Database 34 and Database Specialist Clean up Database 38, an additional Reward Database 75 is attached to WAIN Listing Database 18. Reward Database 75 is used to track any promotional rewards or any other rewards given to the subscriber when they respond to advertisements or promotions that instruct them to assist in cleaning up their record.

Figure 12:
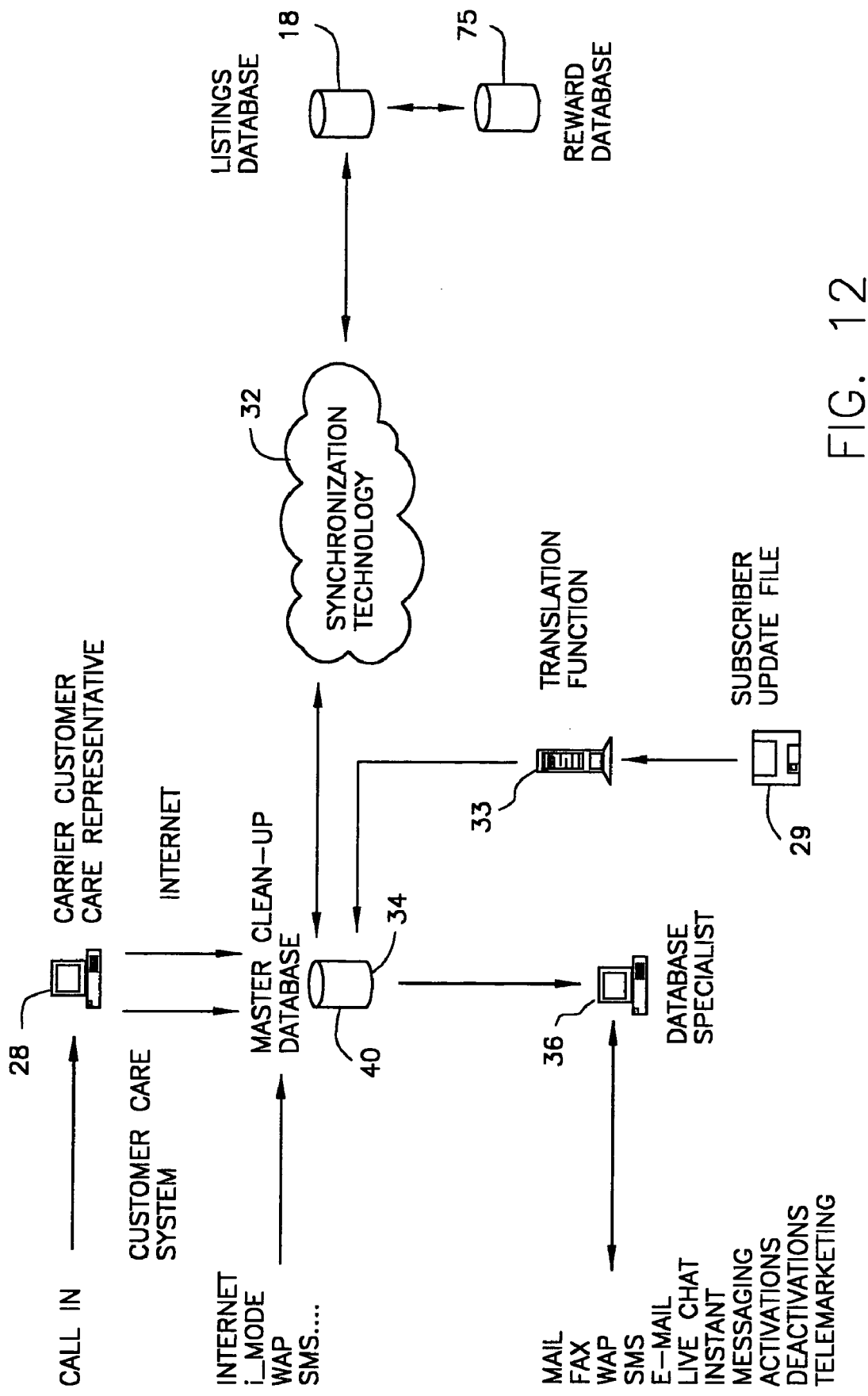
FIG. 12 is a diagram of a second embodiment of an arrangement used to create and maintain a WAIN listings database in accordance with the present invention.

For example, when a subscriber responds to a promotion and updates his or her record by one of the methods described above, Reward Database 75 stores the information concerning the promotional incentive. Based on the particular incentive, Reward Database 75 encodes the free service into Database 18 by adding the appropriate codes to Listing Table 52A of the subscriber's entry. Where appropriate, information of applicable incentives can be sent from Database 18 to the subscriber's carrier. Reward Database 75 then removes the code at the specified time when the promotion ends or the promotion has been paid out. The promotions listed above are intended only as examples of possible promotional and incentive schemes and are not intended to limit the scope of the invention in any way. Any promotion that is conveyed to any size subscriber that is used to maintain and update Database 18 is within the contemplation of the present invention FIG. 12 is a diagram of a second embodiment in which WAIN Listings Database 18 can be created and maintained. The primary difference between the first embodiment shown in FIG. 11 and the second embodiment shown in FIG. 12 is that the second embodiment replaces Carrier Clean-up Database 30, Internet Clean-up Database 34 and Database Specialist Clean-up Database 38 with Master Clean-up Database 40. Master Clean-up Database 40 serves the aggregate functions of Carrier Clean-up Database 30, Internet Clean-up Database 34 and Database Specialist Clean-up Database 38 and is used as a common interface point for Carrier Customer Care Terminal 28, Internet and/or data-related updates and Database Specialist Terminal 36.

Master Clean-up Database 40 is synchronized with Wireless Apparatus Identification Number (WAIN) Listings Database 18 via Synchronization Technology 32. The use of a master clean-up database simplifies the synchronization technology requirements by requiring less synchronization and simplifies network connectivity, hardware and software expenses and maintenance expenses resulting from lesser requirements as compared with the first embodiment. It is important to note that both approaches are likely to be used by different carriers, based on their network and security requirements.

Figure 13:
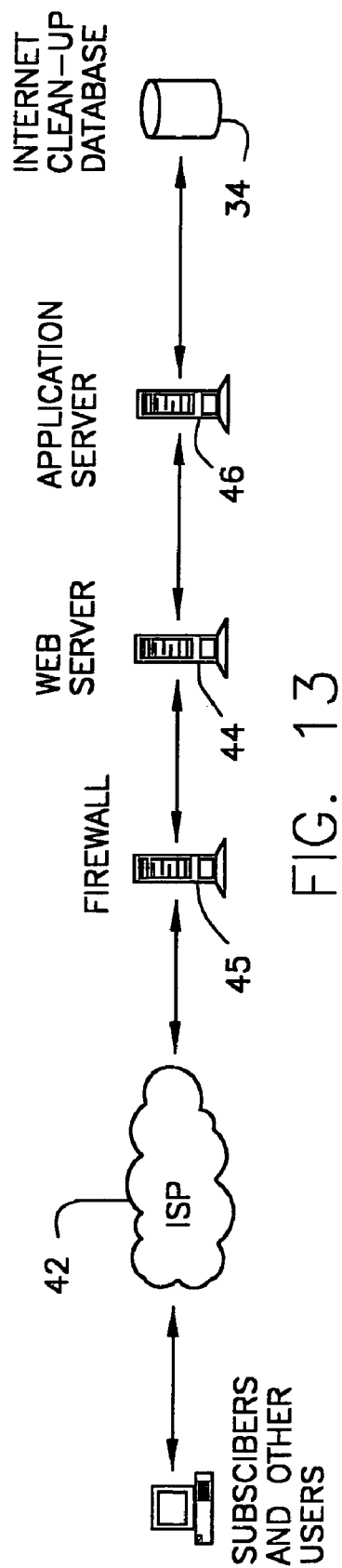
FIG. 13 is a diagram of an example of the components used to provide access to an Internet clean-up database in accordance with one embodiment of the present invention.

FIG. 13 is a diagram of an additional example of the components used to provide access to Internet Clean-up Database 34. As shown in FIG. 13, access from the Internet or other Communication Network 42 is accomplished via one or more Firewalls 45, one or more Web Servers 44 and one or more Application Servers 46. In this manner, subscribers and other users, for example database specialists, carrier customer service representatives and the like use Communication Network 42 to establish a communication session using a web browser or other graphical user interface technology capable of supporting a data communication session between the subscriber's terminal and Web Server 44 via Communication Network 42. Software and methods for facilitating communication between a subscriber terminal and Web Server 44 are known.

Web Server 44, Firewall 45 and Application Server 46 can take the form of any known computer hardware equipped with random access memory, read-only memory, a central processing unit, network interface and appropriate storage devices. For example, personal computer servers equipped with INTEL-based (or compatible processors) or UNIX servers can be used. In general, Web Server 44, Firewall 45 and Application Server 46 are sized to have capacities corresponding to the anticipated demand placed thereon.

As shown in FIG. 13, Web Server 44 facilitates communications with the subscribers using Communication Network 42 and serves, for example, web pages using the hypertext transfer protocol (HTTP), preferably written in one or more of combination of Active-X, JAVA and hypertext mark-up language (HTML).

The underlying application driving Web Server 44, for example, the application which accesses Internet Clean-up Database 34 and provides Web Server 44 with various data and options to present to the subscribers is performed by Application Server 46. In other words, Application Server 46 stores and executes software controlling the overall interaction between a subscriber and Internet Clean-up Database 34 by instructing Web Server 44.

Web server 44 compiles HTML display screens to present to the subscriber's terminal using predetermined display screen arrangements and data provided by Application Server 46 and/or the user. Of course, Web Server 44 can also send Active-X instructions, JAVA applets and the like. Web server 44, Firewall 45, Application Server 46 and Internet Clean-up Database 34 can communicate using any networking technology.

Web server 44, Firewall 45, Application Server 46, their arrangement and overall operating software are known to those of ordinary skill in the art. However, the software needed to implement the specific functions of the present invention as described herein are aspects of the present invention which are not known.

Figure 14:
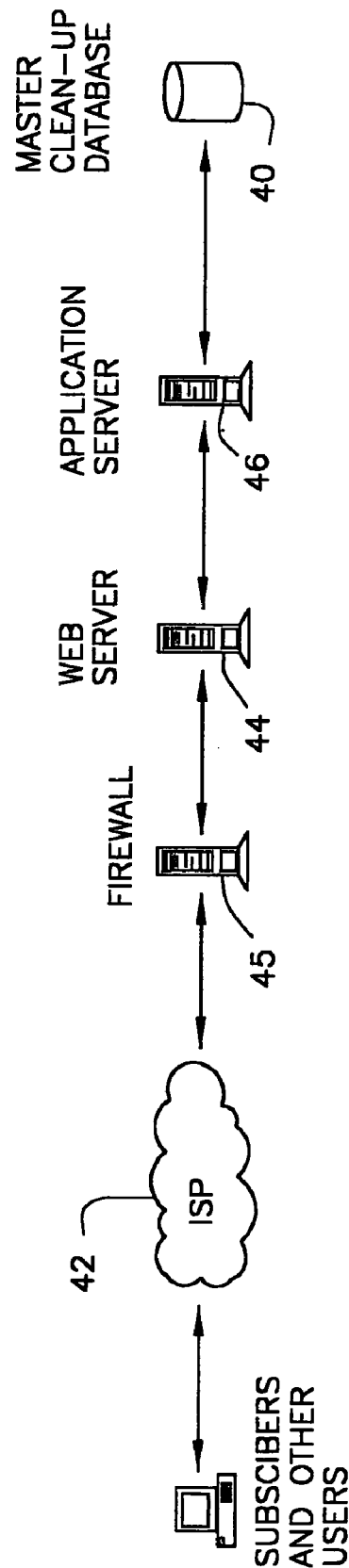
FIG. 14 is a diagram of an example of the components used to provide access to a master clean-up database in accordance with one embodiment of the present invention.

FIG. 14 shows an example of the components used to provide access to Master Clean-up Database 40 in accordance with the present invention, for example providing access to the arrangement shown in FIG. 12. It should be noted that the physical arrangement of Firewall 45, Web Server 44 and Application Server 46, in addition to the software executing thereon is preferably the same as that shown in FIG. 13. The most significant difference between the arrangement shown in FIG. 14 and that shown in FIG. 13 is the use of Master Clean-up Database 40 instead of Internet Clean-up Database 34.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A billing system for a communication assistance system that provides access to information corresponding to a plurality of subscriber listings, the system comprising:
   a telephone switch for receiving calls from a plurality of callers desiring access to said information corresponding to subscriber listings;
   a database configured to store said information corresponding to each of said subscriber listings, including phone numbers of each of said subscribers; and
   a billing record database coupled to said switch, configured to store information corresponding to amount of time caller was connected to each one of said subscriber listings, wherein said communication assistance system further provides instructions to said subscriber's service provider such that said subscriber is not billed for said call when said caller is connected to said subscriber.

2. The system in accordance with claim 1, further comprising a call center coupled to said switch for routing each of said received calls from said caller to an operator terminal.

3. The system in accordance with claim 1, further comprising an operator terminal operated by a customer representative so as to retrieve information stored in said database.

4. The system in accordance with claim 1, further comprising an automated operator terminal so as to automatically retrieve information stored in said database.

5. The system in accordance with claim 2, wherein said billing record database coupled to said switch is additionally coupled to said operator terminal.

6. The system in accordance with claim 2, wherein said billing record database further comprises information corresponding to each service provider that respectively handled a call between a caller and a subscriber.

7. The system in accordance with claim 6, wherein said billing record database is configured to send information stored relating to billing records to a service provider that handled said call for said caller, so as to bill said caller for charges associated with said call between said caller and said subscriber.

8. The system in accordance with claim 7, wherein said charges include airtime utilized by said subscriber during said call between said caller and said subscriber and directory look-up and connection charges, roaming and toll charges associated with airtime use of said subscriber.

9. The system in accordance with claim 8, wherein telephone number of said subscriber is omitted from said caller's bill.

10. The system in accordance with claim 1, wherein said communication assistance system handles distribution of funds collected by said caller's service provider to said subscriber's service provider.

11. The system in accordance with claim 1, wherein said communication assistance system handles distribution of funds collected by said caller's service provider to all service providers that contributed in handling said call between said caller and said subscriber.

12. The system in accordance with claim 11, wherein said subscriber's service provider for handling said call to said subscriber is also said caller's wireless carrier.

13. A communication assistance system for providing access to information corresponding to a plurality of subscriber listings, the system comprising:
   a telephone switch for receiving calls from a plurality of callers desiring access to said information corresponding to subscriber listings, wherein said switch is configured to generate an incoming call information record containing a subscription rate plan corresponding to service provider rates for each one of said callers;

a database accessible by an operator terminal and configured to store said information corresponding to each of said subscriber listings, including phone numbers of each of said subscribers; and a billing record database coupled to said switch, configured to store information corresponding to amount of time caller was connected to each one of said subscriber listings, wherein said communication assistance system further provides instructions to said subscriber's service provider such that said subscriber is not billed for said call when said caller is connected to said subscriber.

14. The system in accordance with claim 13, further comprising a call center coupled to said switch for routing each of said received calls from said caller to an operator terminal.

15. The system in accordance with claim 13, further comprising an operator terminal operated by a customer representative so as to retrieve information stored in said database.

16. The system in accordance with claim 13, further comprising an automated operator terminal so as to automatically retrieve information stored in said database.

17. The system in accordance with claim 13, wherein said subscription rate plan includes a flat fee subscription fee corresponding to various features and services provided by said system.

18. The system in accordance with claim 17, wherein said flat fee varies depending on the type of services subscribed by the caller from their service provider.

19. A billing system for a communication assistance system that provides access to information corresponding to a plurality of subscriber listings, the system comprising:

a telephone switch for receiving calls from a plurality of callers desiring access to said information corresponding to subscriber listings, wherein said switch is configured to generate an incoming call information record containing a subscription rate plan corresponding to service provider rates for each one of said callers; and a database directory listing storing information corresponding to each one of said subscriber listings including their phone number, said information said information in said subscriber listings including a Rate Plan field associated with billing rates corresponding to each one of said subscribers; and a billing record database coupled to said switch, configured to store information corresponding to amount of time caller was connected to each one of said subscriber listings, wherein said communication assistance system further provides instructions to said subscriber's service provider such that said subscriber is not billed for said call when said caller is connected to said subscriber.

20. A method of operating a billing system for a communication assistance system that provides access to information corresponding to a plurality of subscriber listings, said method comprising the steps of:

receiving calls from a plurality of a callers desiring to access said information corresponding to subscriber listings, at a telephone switch;

accessing a first database and retrieving said information corresponding to a subscriber listing, including phone numbers of each of said subscribers;

storing information corresponding to said caller accessing said information and an amount of time said caller was connected to each one of said subscribers in a billing record database; and instructing said subscriber's service provider not to bill said subscriber for said call when said caller is connected to said subscriber.

21. A method of operating a communication assistance system for providing access to information corresponding to a plurality of subscriber listings, said method comprising the steps of:

receiving calls from a plurality of a callers desiring to access said information corresponding to subscriber listings, at a telephone switch;

generating an incoming call information record containing a Feature Code field, said feature code field containing a subscription rate plan corresponding to service provider rates for each one of said callers;

accessing a first database and retrieving said information corresponding to each of said subscriber listings, including phone numbers of each of said subscribers; and storing information corresponding to said caller accessing said information and an amount of time said caller was connected to each one of said subscribers in a billing record database; and instructing said subscriber's service provider not to bill said subscriber for said call when said caller is connected to said subscriber.

* * * * *